United States Patent
Yamamoto et al.

(10) Patent No.: US 6,570,827 B1
(45) Date of Patent: *May 27, 2003

(54) OPTICAL ELEMENT FOR CORRECTION OF CHROMATIC ABERRATION, OPTICAL PICK-UP DEVICE HAVING OPTICAL ELEMENT FOR CORRECTION OF CHROMATIC ABERRATION, OPTICAL REPRODUCING DEVICE HAVING OPTICAL PICK-UP DEVICE AND OPTICAL RECORDING AND REPRODUCING DEVICE

(75) Inventors: Kenji Yamamoto, Tokyo (JP); Isao Ichimura, Tokyo (JP); Fumisada Maeda, Tokyo (JP); Toshio Watanabe, Kanagawa (JP); Akira Suzuki, Kanagawa (JP); Kiyoshi Osato, Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,505

(22) Filed: Jun. 18, 1999

(30) Foreign Application Priority Data

Jun. 30, 1998 (JP) ............................................ 10-184918

(51) Int. Cl.$^7$ ................................................. G11B 7/00
(52) U.S. Cl. .............................. 369/44.14; 369/112.01; 369/112.23; 369/112.26; 359/796
(58) Field of Search .......................... 369/44.14, 44.32, 369/44.24, 44.12, 44.23, 112.24, 112.23, 112.26, 112.03, 112.07; 359/711, 565, 572, 708, 709, 641, 722, 719, 721, 796, 793, 794, 656, 661

(56) References Cited

U.S. PATENT DOCUMENTS

| | | | | |
|---|---|---|---|---|
| 4,815,059 A | * | 3/1989 | Nakayama et al. | 369/44.24 |
| 4,855,987 A | * | 8/1989 | Versluis | 369/44.32 |
| 5,157,555 A | * | 10/1992 | Reno | 369/44.11 |
| 5,202,867 A | * | 4/1993 | Matsui et al. | 369/44.23 |
| 5,303,221 A | * | 4/1994 | Maeda et al. | 369/44.12 |
| 5,467,225 A | * | 11/1995 | Manabe | 359/661 |
| 5,535,058 A | * | 7/1996 | Tanaka et al. | 359/711 |
| 5,715,091 A | * | 2/1998 | Meyers | 359/565 |
| 5,808,999 A | * | 9/1998 | Yagi | 369/112.26 |
| 5,872,761 A | * | 2/1999 | Sugi et al. | 369/44.24 |
| 5,910,940 A | * | 6/1999 | Gurerra | 369/112.24 |
| 5,920,432 A | * | 7/1999 | Suenaga et al. | 359/656 |
| 6,014,262 A | * | 1/2000 | Noda | 359/641 |

* cited by examiner

Primary Examiner—William Korzuch
Assistant Examiner—Kim-Kwok Chu
(74) Attorney, Agent, or Firm—Oblon, Spivak, McClelland, Maier & Neustadt, P.C.

(57) ABSTRACT

This invention provides an optical element for correcting a chromatic aberration corresponding to a short wavelength of a light source and further provides an optical pick-up device having the optical element for correcting a chromatic aberration and adapting for a further higher recording density and larger capacity of the optical recording medium, the optical reproducing device and the optical recording and reproducing device. The optical element for correcting a chromatic aberration arranged between a light source such as a semiconductor laser or the like with a wavelength being 440 nm or less and an objective with numerical aperture NA being 0.55 or more, a focal distance being 1.8 mm or more and an Abbe number at the d-line (587.6 nm) being 95.0 or less has a convex lens with at least an Abbe number at the d-line being 55 or more and a concave lens with an Abbe number at the d-line being 35 or less.

11 Claims, 26 Drawing Sheets

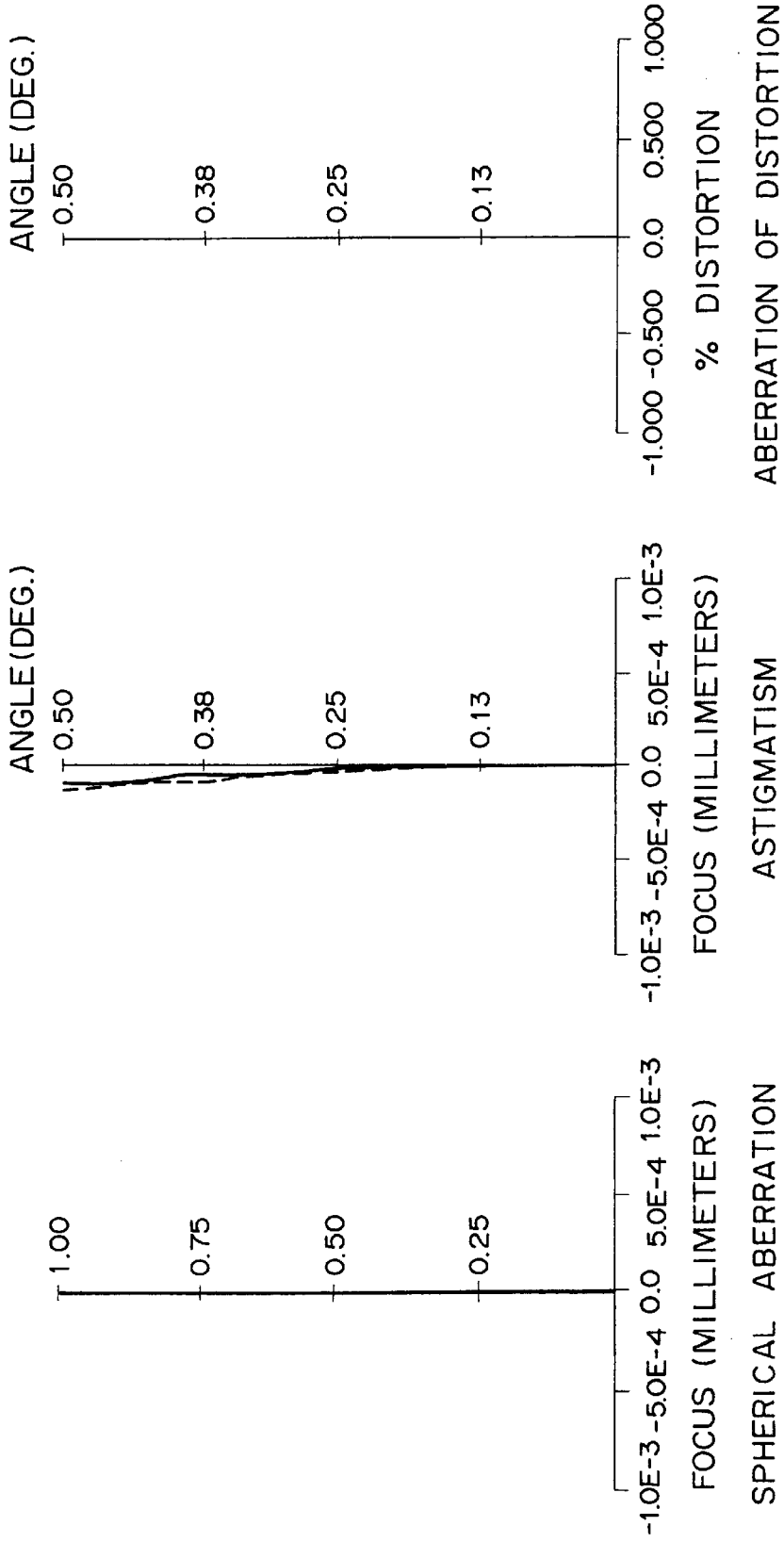
FIG. 3A  LONGITUDINAL SPHERICAL ABER.
FIG. 3B  ASTIGMATIC FIELD CURVES
FIG. 3C  DISTORTION

LATERAL ABERRATION AT AN IMAGE ANGLE OF 0.5°

LATERAL ABERRATION ON AXIS

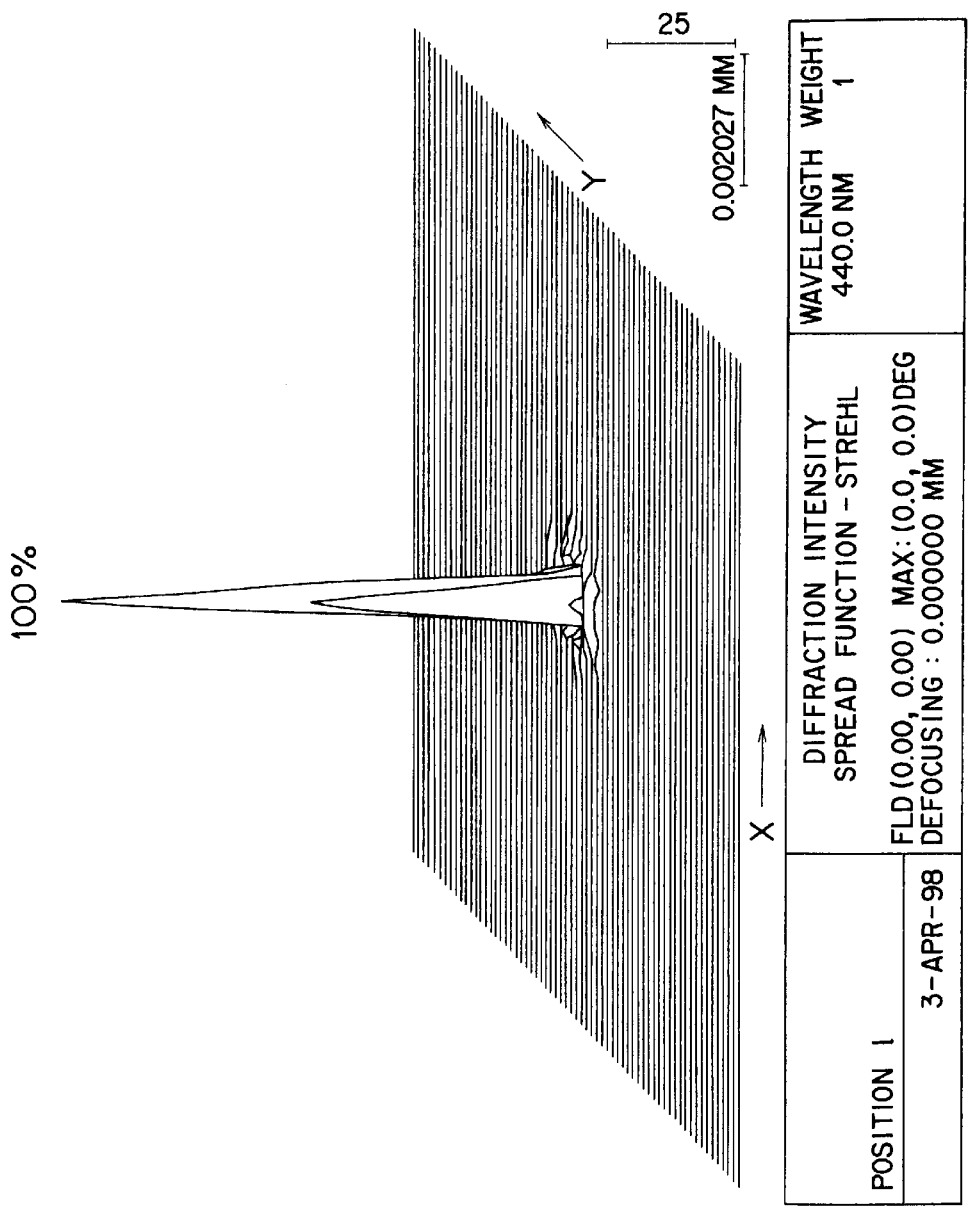

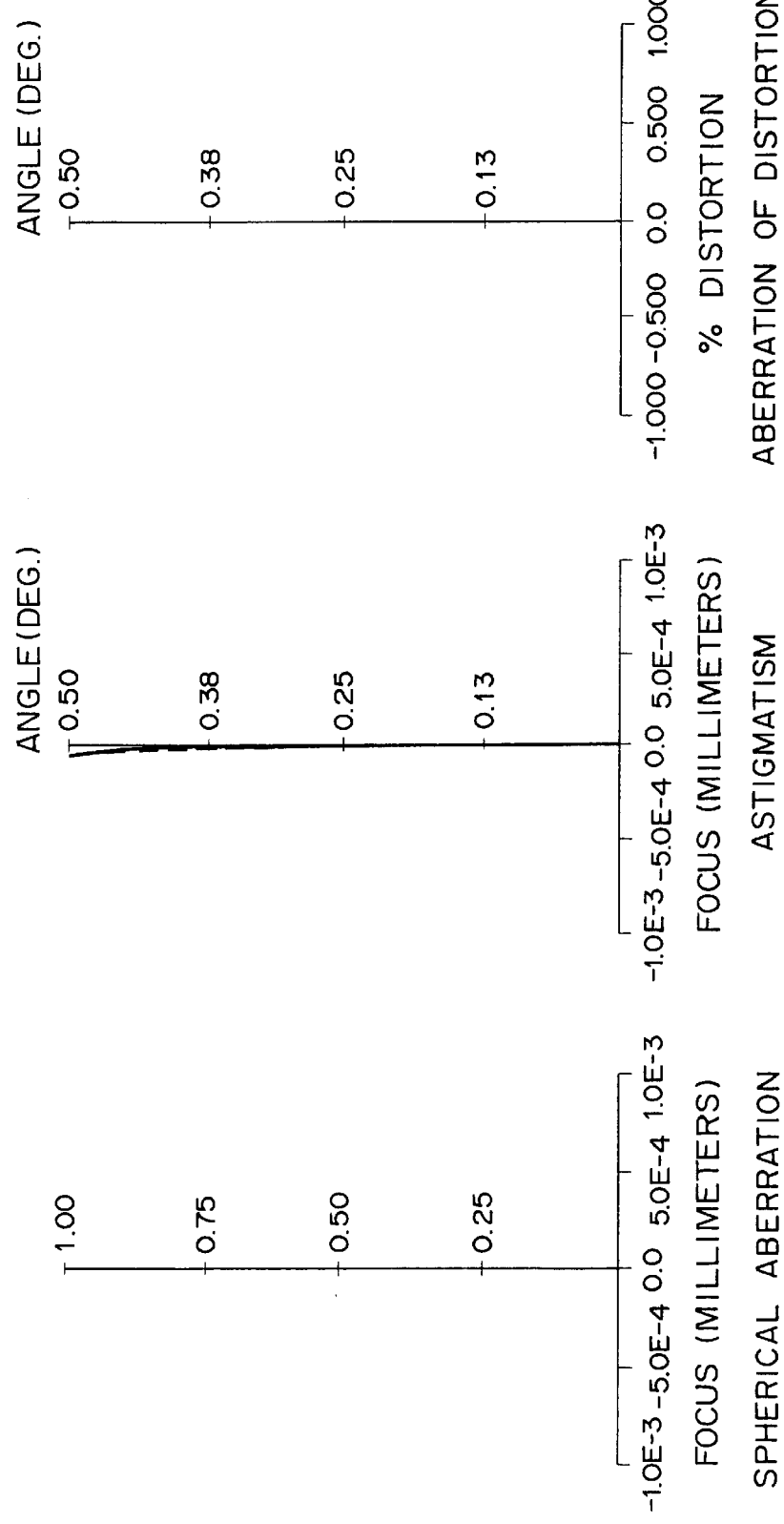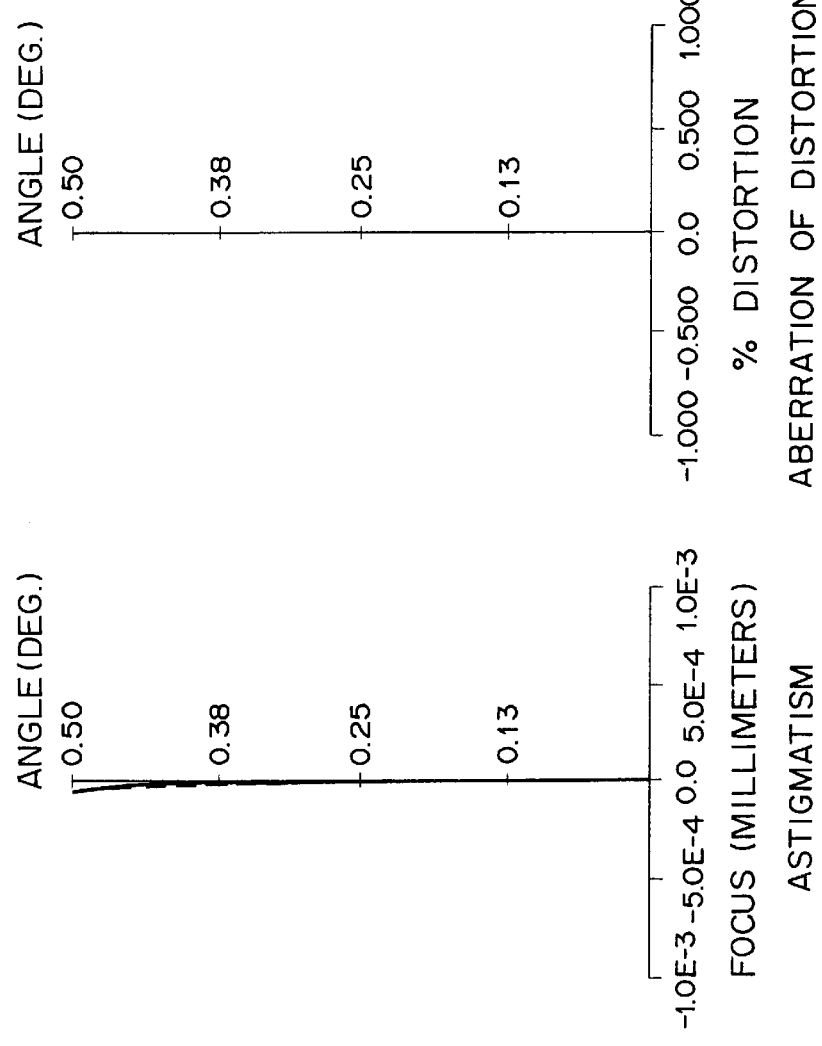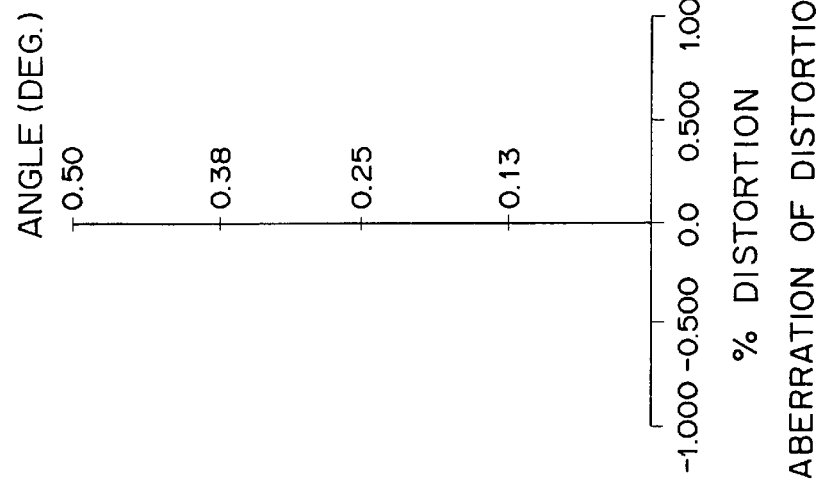

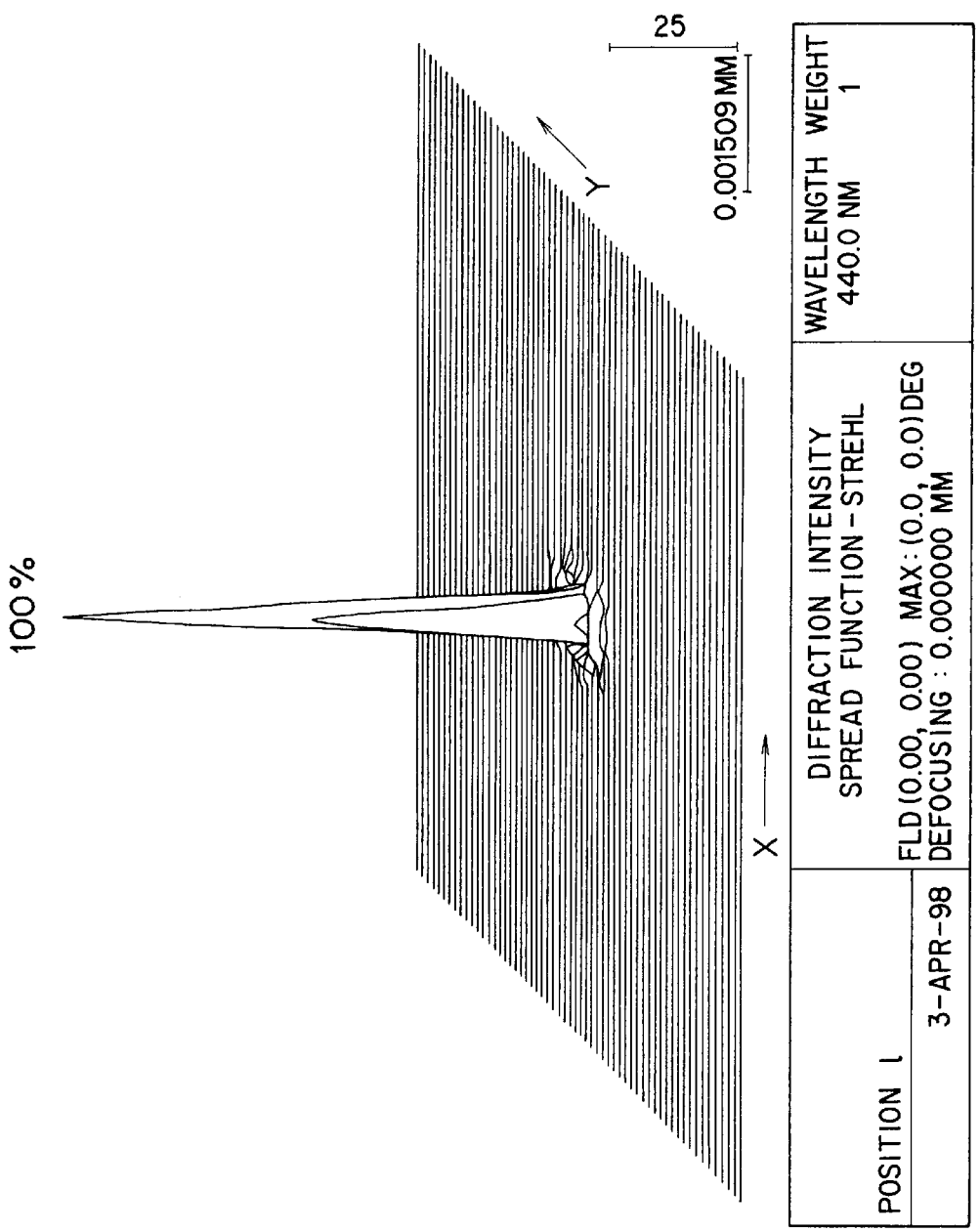
F I G. 13

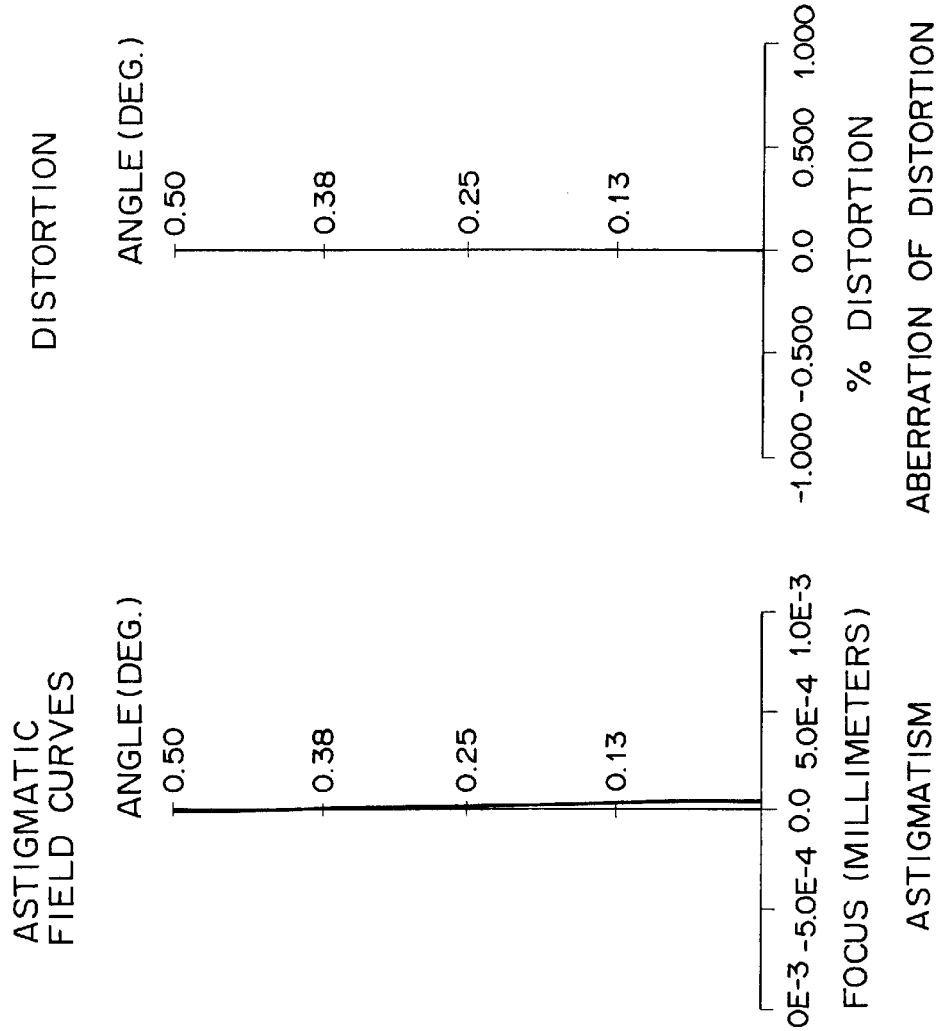
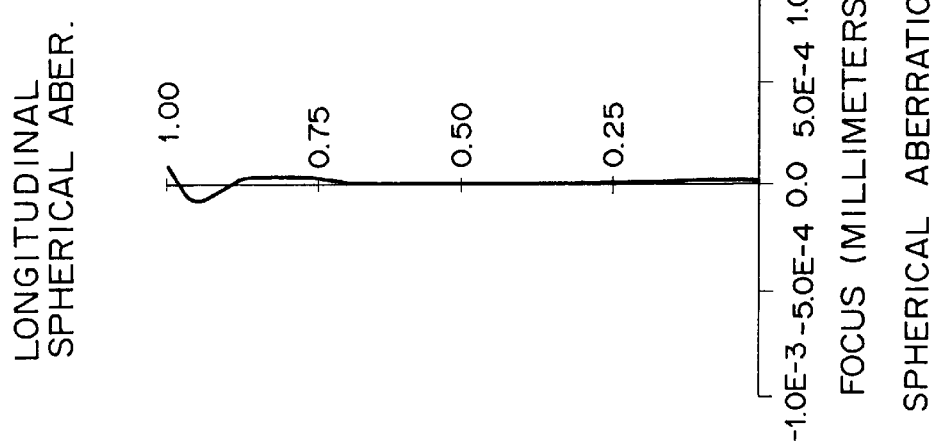
FIG. 18A  FIG. 18B  FIG. 18C

LATERAL ABERRATION AT AN IMAGE ANGLE OF 0.5°

LATERAL ABERRATION ON AXIS

LONGITUDINAL SPHERICAL ABER.

ASTIGMATIC FIELD CURVES

DISTORTION

OPTICAL ELEMENT FOR CORRECTION OF CHROMATIC ABERRATION, OPTICAL PICK-UP DEVICE HAVING OPTICAL ELEMENT FOR CORRECTION OF CHROMATIC ABERRATION, OPTICAL REPRODUCING DEVICE HAVING OPTICAL PICK-UP DEVICE AND OPTICAL RECORDING AND REPRODUCING DEVICE

BACKGROUND OF THE INVENTION

1. Field of the Invention

This invention relates to an optical element for correcting a chromatic aberration, an optical pick-up device having the optical element for correcting a chromatic aberration, an optical reproduction device having this optical pick-up device and an optical recording and reproduction device, and more particularly an optical element for correcting a chromatic aberration generated at each of optical planes in an optical system, an optical pick-up device having the optical element for correcting a chromatic aberration, an optical reproduction device having this optical pick-up device and an optical recording and reproduction device.

2. Description of the Related Art

ROM (Read-Only-Memory) type optical disc represented by a CD (Compact Disc), a RAM (Random Access Memory) type optical disc represented by a phase changing disc or a magneto-optic disc or an optical recording medium represented by an optical card and the like are widely used as storing media such as image information, audio information or programs for information equipment. In the case of these optical recording media, a high density and a large capacity have been gradually attained and in the case of the optical pick-up device corresponding to these optical pick-up devices, a short wave length formation of a light source, semiconductor laser, for example, or a large NA (Numerical Aperture) of an objective has been attained and a small diameter of a light collecting spot collected through the objective has been attained. For example, in the case of the CD which has been merchandised at a relative initial stage, a wave length of the light source is set to 780 nm, and to the contrary, in the case of DVD (Digital Video Disc or Digital Versatile Disc) which has been recently merchandised, a wave length of the light source is set to either 650 nm or 685 nm. However, in recent years, it has been desired to attain a higher density and a higher capacity of the optical recording medium and in correspondence with this trend, the wave length of the light source has been apt to show more and more a short wave length.

A chromatic aberration is an aberration which is generated when either a lens or an optical system must process either a multi wave length or a continuous wave length and a refractive index of optical material is made different in response to a wave length, resulting in that a focal distance of the objective is also made different. That is, since a refractive index of the optical material in a visual range shows a normal distribution, a refractive index for a blue light becomes a larger value than for a red light. For example, in the case of a convex type glass lens, a focal distance of blue light becomes shorter than a focal distance of red light. A wave length of laser light radiated from a semiconductor laser is generally a mono-chrome (a single mode) and it is assumed that there occurs no chromatic aberration, although actually it has a wave length width of about several nm or so. In addition, there is also a possibility of occurrence of a so-called mode hopping that a central wave length of a laser beam radiated from a semiconductor abruptly flies by several nm due to a variation in temperature or the like.

Accordingly, in the case that a short wave length semiconductor laser of about 440 nm or 440 nm or less, for example, is applied in an optical pick-up device corresponding to a higher density and a higher capacity of the optical recording medium, a chromatic aberration generated at the objective caused by a displacement of wave length becomes a non-allowable important problem. As to the fact that the chromatic aberration becomes high in response to a short wave length, it may be considered that there are two causes for it. A first cause consists in the fact that if a short wave length is applied in a usual objective, a variation of refraction index becomes large in respect to a minute variation in wave length and a defocusing amount which is an amount of motion of a focal point becomes large. A second cause consists in the fact that as a higher density and a higher capacity of the optical recording medium are attained, it is necessary to keep a diameter of a converging spot to be converged by the objective as less as possible, although as a depth of focus (d) of the objective is expressed by an equation of $d=\lambda/(NA)^2$ (where, $\lambda$ is a wave length $\lambda$ of a light source and NA is a numerical aperture of the objective), the depth of focus (d) becomes low as the wave length to be handled is short and even a slight defocusing is not allowed.

In order to keep the chromatic aberration of the objective low, it can be applied that optical material having a low dispersion property is used as the objective, although the chromatic aberration is even high under a short wave length. In addition, although it is possible that the objective is an achromatic lens composed of a plurality of lenses, a weight of the achromatic lens composed of a plurality of lenses becomes heavy. For example, in the case that the achromatic lens having a heavy weight is used as an objective and this objective is applied in a double-axis actuator for use in controlling and driving the objective in a focusing direction and a tracking direction, there occurs a possibility that servo quality such as focusing servo property and tracking servo property is reduced. In addition, in the case that the heavy achromatic lens is used as an objective, a high current is required in a drive power supply for the double-axis actuator and at the same time a drive circuit or a power supply or the like becomes large in size, resulting in that this may prohibit a small-sized formation of the optical pick-up device, the optical reproducing device provided with this optical pick-up device or the optical recording and reproducing device.

SUMMARY OF THE INVENTION

The present invention provides an optical element for correcting chromatic aberration in correspondence with a formation of short wavelength of the light source and provides an optical pick-up device, an optical reproducing device and an optical recording reproducing device in correspondence with a higher recording density and a higher capacity of the optical recording medium under application of this optical element for correcting chromatic aberration.

In order to solve the aforesaid subject matter, the optical element for correcting chromatic aberration of the present invention defined in claim 1 is arranged between a light source such as a semiconductor laser or the like with a wavelength being less than 440 nm and an objective with NA being 0.55 or more, with a focal distance being 1.8 mm or more and with an Abbe number at the d-line (Fraunhofer's d-line of 587.6 nm, the color produced by an emission line of helium) being 95.0 or less, wherein the optical element for correcting chromatic aberration has a convex lens with at least an Abbe number of the d-line being 55 or more and a concave lens with an Abbe number of the d-line being 35 or less.

The optical element for correcting chromatic aberration of the present invention defined in claim 2 is arranged between a light source such as a semiconductor laser or the like with a wavelength being less than 440 nm and an objective composed of two lenses with NA being 0.70 or more, with a focal distance being 1.4 mm or more and with an Abbe number at the d-line being 95.0 or less, wherein the optical element for correcting chromatic aberration has a convex lens with at least an Abbe number of the d-line being 55 or more and a concave lens with an Abbe number of the d-line being 35 or less.

That is, the optical element for correcting chromatic aberration of the present invention defined in claims 1 and 2 is constructed such that the optical element is arranged between the light source and the objective irrespective of whether or not a flux of light at a position where the optical element is arranged is a converging flux of light or a diverging flux of light, a chromatic aberration of polarity opposite to that of the chromatic aberration generated at other optical surfaces is generated at an uneven surface through which the light passes. Accordingly, an uneven surface where the light passes through the objective and focuses at a focal point is kept at a state in which the chromatic aberration is cancelled, and an entire optical system becomes a system in which a superior correction of chromatic aberration is carried out within a range of variation of wavelength at the light source.

The chromatic aberration is generated when a refractive index (n) of optical material is changed only by $\Delta n$ due to a variation in wavelength $\Delta \lambda$ of the light source. Then, a variation $\Delta f$ of a focal distance (f) of a thin lens is given by a following equation (1):

$$(\Delta f/f) + \Delta n/(n-1) = 0 \quad (1)$$

wherein:

$\Delta n/(n-1) = (n_F - n_C)/(n_d - 1) = v_d$, $\Delta f = \Delta_{F-C}$ cause a following equation (2) to be attained, $v_D$ is an Abbe number, $\Delta_{F-C}$ is a variation in focal distance at a line C and at a line F, $n_F$, $n_C$, $n_d$ are refractive indexes against a Fraunhofer's lines F (486.1 nm), line C (656.3 nm) and d-line (587.6 nm), respectively.

$$\Delta_{F-C} = -f/v_D \quad (2)$$

A chromatic aberration of the objective appears as an absolute value of variation in a focal distance (f) and as apparent from the above equation (2), the larger the focal distance (f), the larger a chromatic aberration, or the smaller the Abbe number $v_D$ of the optical material constituting the objective, the larger a chromatic aberration. Further, a depth of focus of the objective is given by $d = \Delta/(NA)^2$, the shorter a wavelength or the larger a value of NA, the smaller a depth of focus, and the larger a deterioration of optical property caused by the chromatic aberration.

The optical element for correcting a chromatic aberration of the present invention has a configuration of two lenses in 1-group or one lens in 2-groups and it is preferable to make a configuration under a combination of a convex lens with an Abbe number at the d-line being 55 or more and a concave lens with an Abbe number at the d-line being 35 or less. A chromatic aberration can be expressed as a variation $\Delta K$ of a refraction force K. When a refraction force of the objective is defined as $K_1$, a variation $\Delta K_1$ of the refraction force under variation of the wavelength is expressed by a following equation (3);

$$\Delta K_1 = K_1 \times \Delta n/(n+1) \quad (3)$$

If it is assumed that a variation $\Delta n$ of a refractive index (n) of the optical material caused by a variation in wavelength of the light source is defined as $\Delta n > 0$, $K_1$ is a positive value due to the fact that it is a refraction force of the converging lens and then $\Delta K_1$ becomes $\Delta K_1 > 0$ in reference to equation (3). In order to eliminate this state, it is satisfactory that an amount of variation $\Delta K$ caused by a wavelength of a composite refraction force $K = K_2 + K_3$ of the optical element for correcting a chromatic aberration comprised of two lenses in one group or two lenses in two groups expressed by a following equation (4) becomes $\Delta K < 0$.

$$\Delta K = (K_2/v_2) + (K_3/v_3) < 0 \quad (4)$$

wherein:

$K_2$ and $K_3$ are refraction forces of each of the two lenses in one group or one lens in two groups, and $v_2$ and $v_3$ are Abbe numbers of each of two lenses in one group or one lens in two groups.

Further, in the case that the optical element for correcting a chromatic aberration is arranged in a beam with narrow widening angle radiated from the light source such as a semiconductor laser or the like or a substantial collimator optical path, the optical element for correcting a chromatic aberration has scarcely a power as compared with the refraction force $K_1$ of the objective, resulting in that it is possible to assume that an equation of $K = K2 + K3 = 0$ is attained and $K_2 = -K_3$ is accomplished. Accordingly, equation (4) becomes as follows.

$$K_2/v_2 < -K_3/v_3 = K_2/v_3 \quad (5)$$

If it is assumed that $K_2 > 0$ is attained, i.e. a convex lens is applied, a relation of $K_3 < 0$ is attained, i.e. a concave lens is applied and a relation of $V_2 > V_3$ is attained. To the contrary, if it is assumed that $K_2 < 0$ is attained, i.e. a concave lens is applied, a relation of $K_3 > 0$ is attained, i.e. a convex lens is applied and a relation of $V_2 < V_3$ is attained. That is, it is satisfactory that as a lens having a positive power, a crown glass, for example, is used, and as a lens having a negative power, a flint glass is used, and when a light source with a wavelength being 440 nm or less, it is necessary to make a quite high chromatic aberration to correct a chromatic aberration generated at each of the optical surfaces, so that it is desirable that a large difference is kept between the values of $v_2$ and $v_3$. For example, as a normal delustered tablet lens (a chromatic lens), a lens in which a convex lens of crown glass with a low dispersion and a concave lens of flint glass with a high dispersion are adhered to each other is applied. Although this lens by itself is a lens in which its chromatic aberration is restricted against a variation in wavelength, the optical element for correcting the chromatic aberration of the present invention by itself is required to generate mainly a chromatic aberration opposite to that of the objective so as to correct also the chromatic aberration of the objective and further it becomes necessary to provide a large difference in an Abbe number of the optical material constituting the lens. Then, since combination of the lens having an Abbe number of 55 or more and the lens having an Abbe number of 35 or less enables a chromatic aberration generated at the optical element for correcting a chromatic aberration of the present invention to be increased, a correction of the chromatic aberration generated mainly at the objective can be sufficiently carried out.

The optical pick-up device of the present invention defined in claim 3 is an optical pick-up device comprising a light source with at least a wavelength being 440 nm or less, an objective with NA being 0.55 or more, a focal distance being 1.8 mm or more and an Abbe number at the d-line being 95.0 or less, and an optical element for correcting a chromatic aberration arranged between the light source and the objective, wherein the optical element for correcting a chromatic aberration has a convex lens with at least an Abbe number at the d-line being 55 or more and a concave lens with an Abbe number at the d-line being 35 or less.

The optical pick-up device of the present invention defined in claim 4 is an optical pick-up device comprising a light source with at least a wavelength being 440 nm or less, an objective composed of two lenses with NA being 0.70 or more, a focal distance being 1.4 mm or more and an Abbe number at the d-line being 95.0 or less, and an optical element for correcting a chromatic aberration arranged between the light source and the objective, wherein the optical element for correcting a chromatic aberration has a convex lens with at least an Abbe number at the d-line being 55 or more and a concave lens with an Abbe number at the d-line being 35 or less.

The optical reproducing device of the present invention defined in claim 6 is an optical reproducing device comprising an optical pick-up device including a light source with at least a wavelength being 440 nm or less, an objective with NA being 0.55 or more, a focal distance being 1.8 mm or more and an Abbe number at the d-line being 95.0 or less and an optical element for correcting a chromatic aberration arranged between the light source and the objective, and a controlling and driving means for controlling and driving the optical pick-up device to a tracking direction, wherein the optical element for correcting a chromatic aberration has a convex lens with at least an Abbe number at the d-line being 55 or more and a concave lens with an Abbe number at the d-line being 35 or less.

The optical reproducing device of the present invention defined in claim 7 is an optical reproducing device comprising an optical pick-up device including a light source with at least a wavelength being 440 nm or less, an objective composed of two lenses with NA being 0.70 or more, a focal distance being 1.4 mm or more and an Abbe number at the d-line being 95.0 or less and an optical element for correcting a chromatic aberration arranged between the light source and the objective, and a controlling and driving means for controlling and driving the optical pick-up device to a tracking direction, wherein the optical element for correcting a chromatic aberration has a convex lens with at least an Abbe number at the d-line being 55 or more and a concave lens with an Abbe number at the d-line being 35 or less.

The optical recording and reproducing device of the present invention defined in claim 9 is an optical recording and reproducing device comprising an optical pick-up device including a light source with at least a wavelength being 440 nm or less, an objective with NA being 0.55 or more, a focal distance being 1.8 mm or more and an Abbe number at the d-line being 95.0 or less and an optical element for correcting a chromatic aberration arranged between the light source and the objective, and a controlling and driving means for controlling and driving the optical pick-up device to a tracking direction, wherein the optical element for correcting a chromatic aberration has a convex lens with at least an Abbe number at the d-line being 55 or more and a concave lens with an Abbe number at the d-line being 35 or less.

The optical recording and reproducing device of the present invention defined in claim 10 is an optical recording and reproducing device comprising an optical pick-up device including a light source with at least a wavelength being 440 nm or less, an objective composed of two lenses with NA being 0.70 or more, a focal distance being 1.4 mm or more and an Abbe number at the d-line being 95.0 or less and an optical element for correcting a chromatic aberration arranged between the light source and the objective, and a controlling and driving means for controlling and driving the optical pick-up device to a tracking direction, wherein the optical element for correcting a chromatic aberration has a convex lens with at least an Abbe number at the d-line being 55 or more and a concave lens with an Abbe number at the d-line being 35 or less.

Action caused by the aforesaid means will be described as follows. Although achromatic aberration generated at the objective becomes large as a wavelength of the light source becomes short, arrangement of the optical element for correcting a chromatic aberration of the present invention between the light source and the objective enables the chromatic aberration to be sufficiently corrected even if a central wavelength of the light source is 440 nm or less and has about several nm wavelength range, for example, or even if a central wavelength shows a mode hopping by about several nm due to a variation in temperature. In addition, it is possible for the optical element for correcting a chromatic aberration of the present invention to act as a function of a collimator lens constituting the optical pick-up device, i.e. a function for changing a radiated light from the light source into a parallel flux of light and then it becomes possible to perform a sufficient correction of the chromatic aberration without increasing the number of optical component parts constituting the optical pick-up device. Accordingly, in the case of the optical pick-up device provided with the optical element for correcting a chromatic aberration of the present invention, there is no possibility of occurrence of the chromatic aberration even if the light source of wavelength of about 440 nm or 440 nm or less is used and further it becomes possible that the optical reproducing device and the optical recording and reproducing device may accommodate for a higher recording density of the optical recording medium.

BRIEF DESCRIPTION OF THE DRAWINGS

FIG. 3A shows a spherical aberration in the schematic configuration view of the optical system of FIG. 1.

FIG. 3B shows an astigmatism in the schematic configuration view of the optical system of FIG. 1.

FIG. 3C shows an aberration of distortion in the schematic configuration view of the optical system of FIG. 1.

FIG. 5 is a view for showing an intensity distribution of point image in the schematic configuration view of the optical system of FIG. 2 when no variation in wavelength occurs.

FIG. 11A shows a spherical aberration in the schematic configuration view of the optical system of FIG. 9.

FIG. 11B shows an astigmatism in the schematic configuration view of the optical system of FIG. 9.

FIG. 11C shows an aberration of distortion in the schematic configuration view of the optical system of FIG. 9.

FIG. 13 is a view for showing an intensity distribution of point image in the schematic configuration view of the optical system of FIG. 10 when no variation in wavelength occurs.

FIG. 18A shows a spherical aberration in the schematic configuration view of the optical system of FIG. 17.

FIG. 18B shows an astigmatism in the schematic configuration view of the optical system of FIG. 17.

FIG. 18C shows an aberration of distortion in the schematic configuration view of the optical system of FIG. 17.

DESCRIPTION OF THE PREFERRED EMBODIMENTS

This invention can be applied to an optical element for correcting a chromatic aberration arranged between a light source and an objective in an optical system for use in recording and reproducing information in an optical recording medium such as a ROM type optical disc represented by a CD or the like, a RAM type optical disc represented by a phase changing disc or a magneto-optic disc or an optical card and the like. In addition, the present invention can be applied to an optical pick-up device for reproducing information or recording and reproducing it in an optical recording medium, an optical reproducing device having this optical pick-up device, and an optical recording and reproducing device. Referring now to FIGS. 1 to 30, some preferred embodiments of the present invention will be described as follows.

Figure 4A:
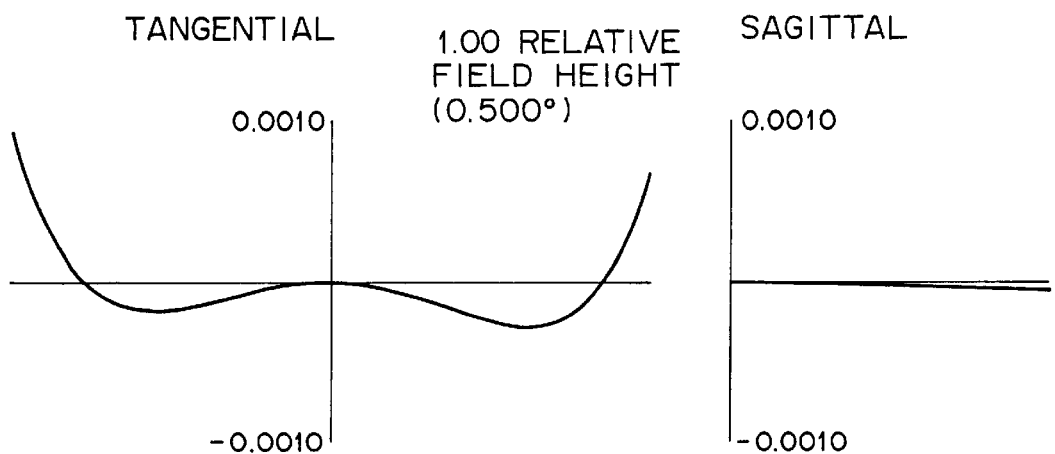
FIG. 4A shows a lateral aberration at an image angle of 0.5° in the schematic configuration view of the optical system of FIG. 1.
Figure 4B:
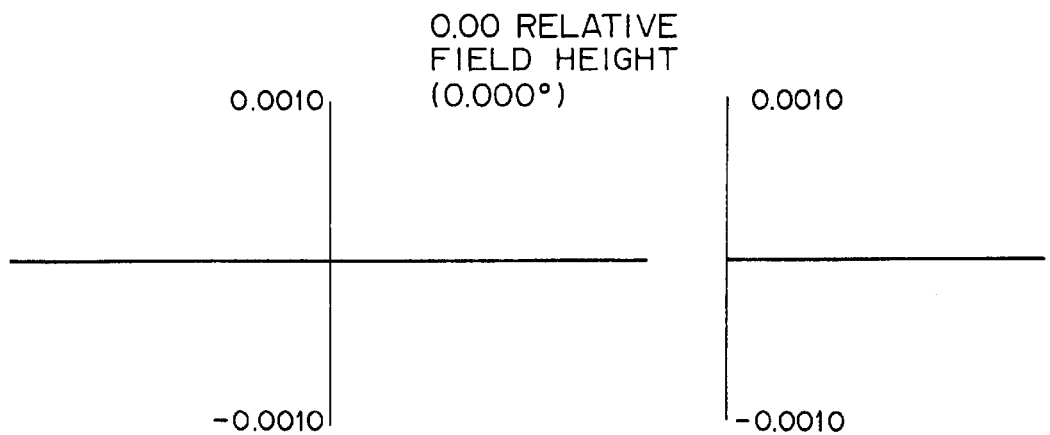
FIG. 4B shows a lateral aberration on axis in the schematic configuration view of the optical system of FIG. 1.

At first, referring to FIG. 1 for showing a schematic configuration view of an optical system, there will be described an example in which a wavelength of a light source is 440 nm or less, an objective 2 is a single lens with NA being 0.55 or more, a focal distance being 1.8 mm or more and an Abbe number at the d-line being 95.0 or less, an optical element 1 for correcting a chromatic aberration of the present invention is arranged between the light source and the objective. In addition, in Tables 1 and 2 are indicated design values at a wavelength of 440 nm in the optical system in the schematic configuration figure of the optical system shown in FIG. 1 and at a wavelength of 650 nm in which the optical element 1 for correcting a chromatic aberration is not used, and a spherical aberration is shown in FIG. 3A, an astigmatism is shown in FIG. 3B, an aberration of distortion is shown in FIG. 3C, a lateral aberration at an image angle of 0.5° is shown in FIG. 4A and a lateral aberration on an axis is shown in FIG. 4B, respectively.

Figure 1:
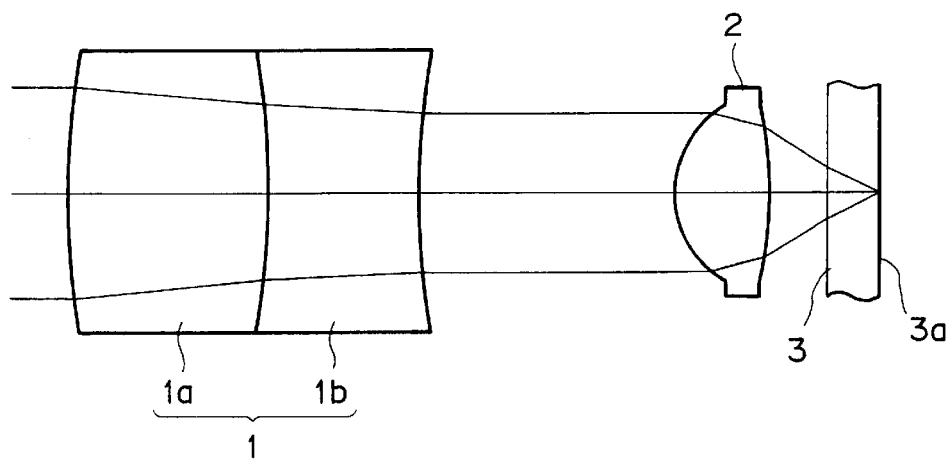
FIG. 1 is a schematic configuration view for showing an optical system in which an optical element for correcting a chromatic aberration of the present invention is arranged.

The schematic configuration figure of an optical system shown in FIG. 1 shows a so-called limitless optical system where an item point is positioned at a limitless far location, wherein the optical element 1 for correcting a chromatic aberration is arranged between a light source such as a semiconductor laser or the like (not shown) and an objective 2. The optical element 1 for correcting a chromatic aberration is comprised of two lenses in one group, wherein a convex lens 1$a$ positioned at the light source side and a concave lens 1$b$ positioned at a side of the objective 2 are adhered to each other. Then, the convex lens 1$a$ is made of optical material having a low dispersion with an Abbe number at the d-line being 55 or more and the concave lens 1$b$ is made of optical material having a high dispersion with an Abbe number at the d-line being 35 or less. With such an arrangement as above, a negative refraction force is provided by a refraction at an adhered plane between the convex lens 1$a$ and the concave lens 1$b$ and a refraction at a radiated plane (an opposing plane with the objective 2) of the concave lens 1$b$, a high chromatic aberration is produced when a wavelength of the light source is varied. The chromatic aberration generated in this case has a polarity opposite to that of the chromatic aberration mainly generated with a positive refraction force of the objective, the chromatic aberration is cancelled when a focal point is attained and the chromatic aberration in an entire optical system can be well corrected within a range of variation of wavelength of the light source.

Figure 2:
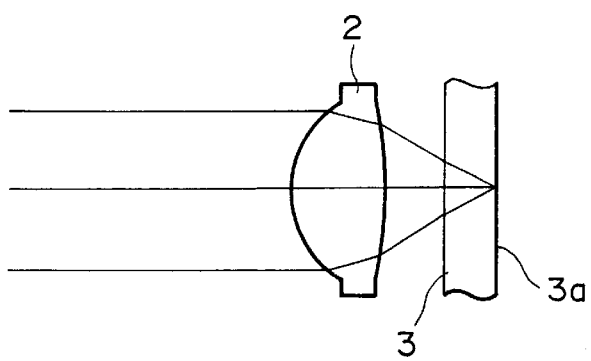
FIG. 2 is a schematic configuration view for showing an optical system in which an optical element for correcting a chromatic aberration is removed from the schematic configuration view of an optical system in FIG. 1.

FIG. 2 is a schematic configuration view for showing an optical system in which an optical element 1 for correcting a chromatic aberration is removed from the schematic configuration view of an optical system in FIG. 1. In the case that the light source is a semiconductor laser, for example, a variation in wavelength of the light source shows a mode hopping in which a central wavelength abruptly flies by about several nm due to a wavelength width of about several nm and a variation in temperature generated when a high frequency overlapping is applied to a drive current of the semiconductor laser. In particular, in the case that the semiconductor laser has a short wavelength of about 440 nm or 440 nm or less, a usual lens having no correction of chromatic aberration shows a high variation in refractive index in respect to a minute variation in wavelength and there is a possibility that non-allowable chromatic aberration is generated. In addition, since a depth of focus is also low, a slight defocusing generated under a chromatic aberration becomes highly a problem against the optical recording medium 3 which is apt to attain a high density and high capacity. In the schematic configuration view for showing the optical system in FIG. 2, if the wavelength of the light source is displaced in such a direction as one in which it is elongated, a focal distance of the objective 2 is increased and at the same time a defocused state (out of a depth of focus) occurs at an information recording surface 3$a$ of the optical recording medium 3, resulting in that a diameter of converging spot at the information recording surface 3$a$ is increased to cause a high quality recording and reproducing of information to become difficult.

Figure 6:
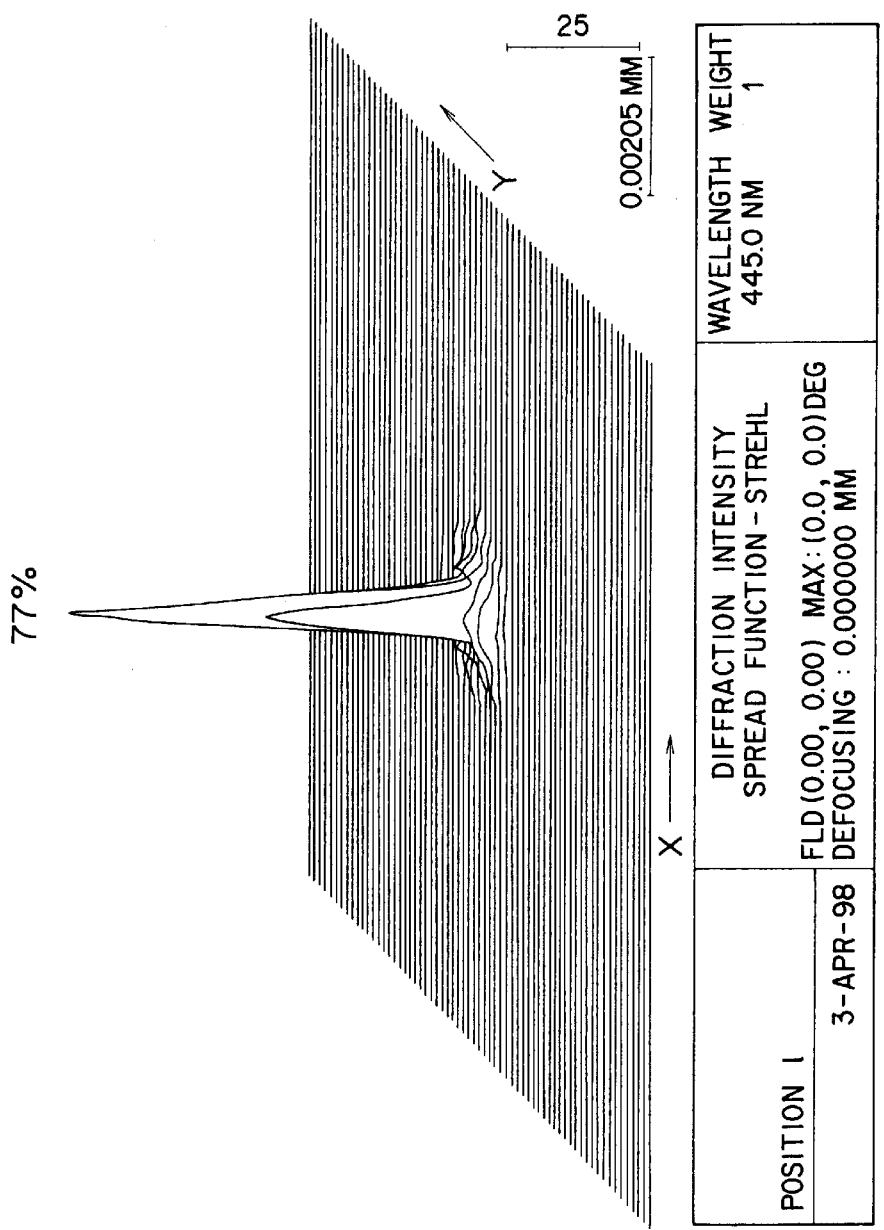
FIG. 6 is a view for showing an intensity distribution of point image in the schematic configuration view of the optical system of FIG. 2 when a variation in wavelength is +5 nm.

In the schematic configuration view of the optical system shown in FIG. 2, a distribution of point image intensity in the case of no variation in wavelength is shown in FIG. 5 and a distribution of point image intensity in the case of variation in wavelength of +5 nm is shown in FIG. 6.

As shown in FIG. 5, an intensity in the intensity distribution of point image is expressed with Strehl values in which an ideal image focusing state is standardized at 100%, wherein a criterion (uneven surface aberration of 0.07 rms $\lambda$) of Marechal which is a lower limit of a superior image reached an optical diffraction limit approximately corresponds to 80%. However, in the optical system shown in FIG. 2 in which the optical element 1 for correcting a chromatic aberration is removed from the schematic configuration view of the optical system shown in FIG. 1, it is apparent that a center of the distribution of the point image intensity is 77% lower than 80%, as shown in FIG. 6, when a variation in wavelength is +5 nm and a sufficient converging spot may not be attained.

Figure 7:
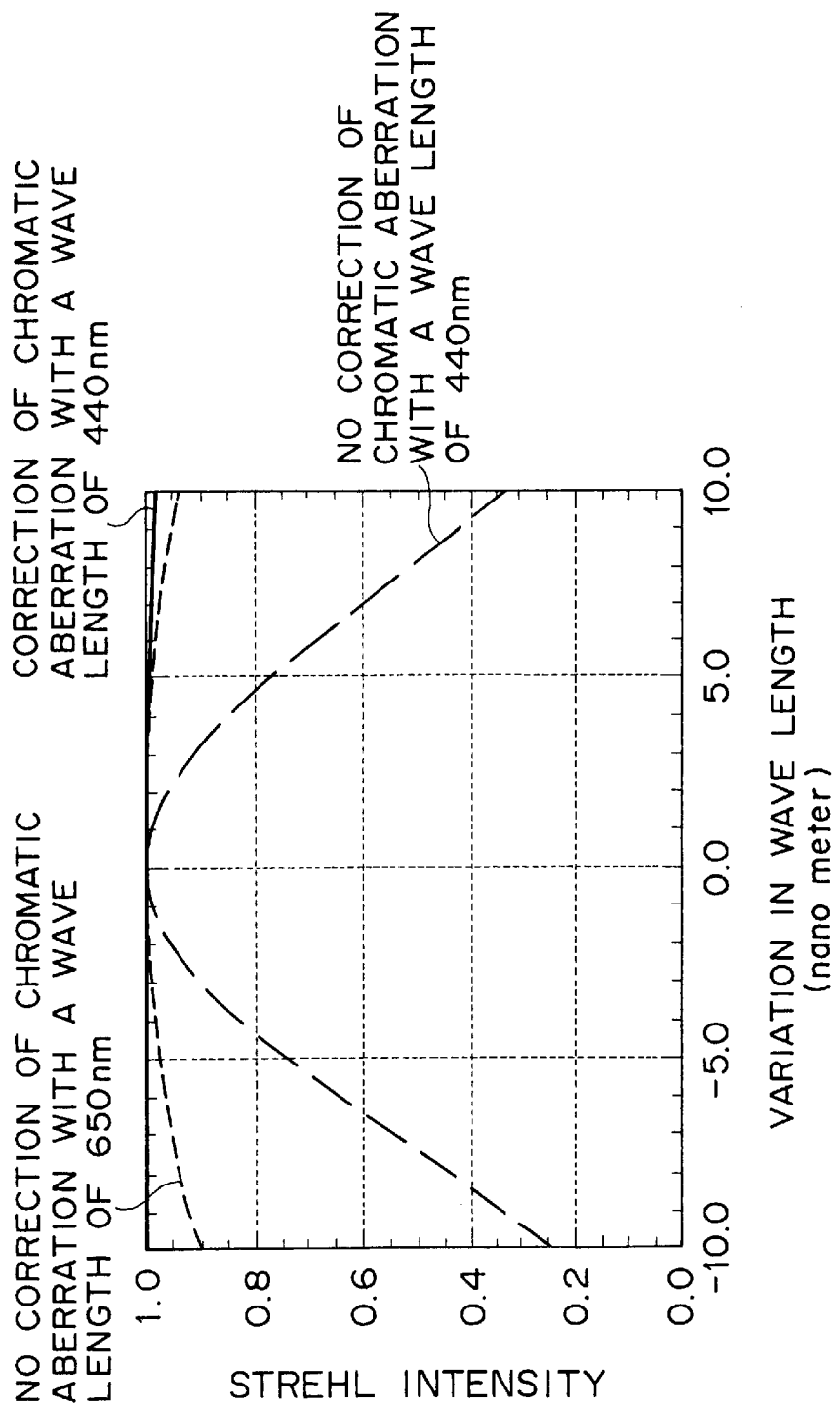
FIG. 7 is a graph for showing a variation of Strehl values when a wavelength is changed from −10 nm to +10 nm in respect to a central wavelength for a case in which a wavelength is 650 nm and a chromatic aberration is not corrected, a case in which a wavelength is 440 nm and a chromatic aberration is not corrected and a case in which a wavelength is 440 nm and a chromatic aberration is corrected, respectively.
Figure 8:
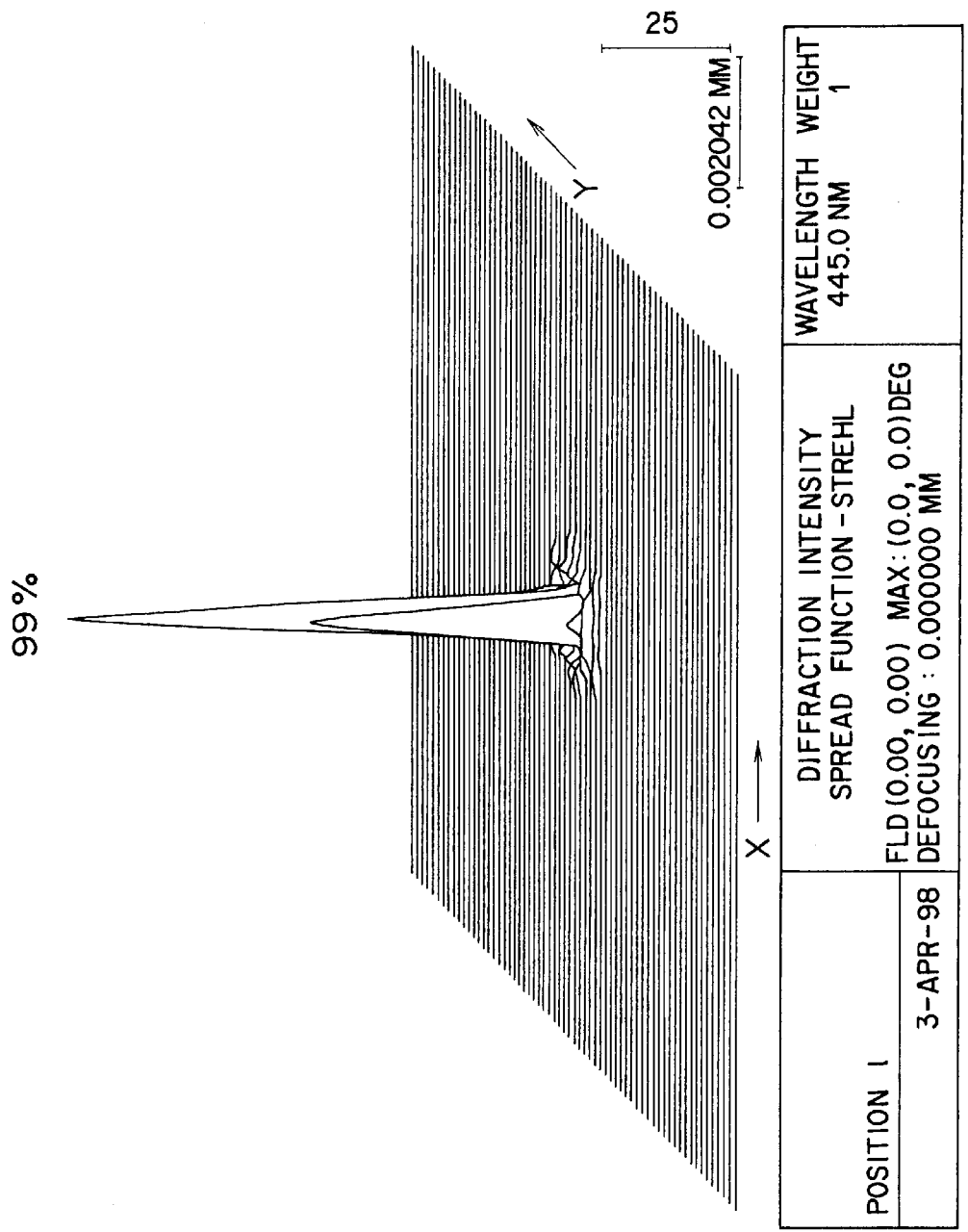
FIG. 8 is a view for showing an intensity distribution of point image in the schematic configuration view of the optical system of FIG. 1 when a variation in wavelength is +5 nm.

FIG. 7 is a graph for showing a variation of Strehl values when a wavelength is changed from −10 nm to +10 nm in respect to a central wavelength for a case in which a wavelength is 650 nm and a chromatic aberration is not corrected, a case in which a wavelength is 440 nm and a chromatic aberration is not corrected and a case in which a wavelength is 440 nm and a chromatic aberration is corrected, respectively. As apparent from FIG. 7, it is apparent that if the wavelength is 650 nm, a correction of chromatic aberration is not required even if the wavelength is changed from −10 nm to +10 nm against the central wavelength, and to the contrary, when the wavelength is 440 nm, no correction of chromatic aberration causes a Strehl value to become 80% or less under a variation of ±5 nm or more and then the chromatic aberration is required to be corrected. Then, it is apparent in the schematic configuration view for showing the optical system having the optical element 1 for correcting the chromatic aberration shown in FIG. 1 that a center of the distribution of point image intensity is 99% higher than 80% and it reaches sufficiently to a diffraction limit without producing any defocusing state as apparent from FIG. 8 for indicating the distribution of point image intensity when the variation in wavelength is +5 nm.

The chromatic aberration of the objective 2 of a single lens as shown in FIG. 2 is deteriorated as a wavelength is shorter as described above, as a value of NA is higher, as a focal distance is longer or as an Abbe number of the optical material constituting the objective 2 is smaller.

Accordingly, in reference to interface values of optical dimensions indicated in the schematic configuration view of FIG. 1, the objective 2 of a single lens having a light source with a wavelength being 440 nm or less, with a value of NA being 0.55 or more, with a focal distance being 1.8 mm and with an Abbe number at the d-line being 95.0 or less may generate a high chromatic aberration which can not be allowed. That is, as shown in the schematic configuration view of the optical system of FIG. 1, it is apparent that it is necessary to correct a chromatic aberration under application of the optical element 1 for correcting chromatic aberration.

Figure 9:
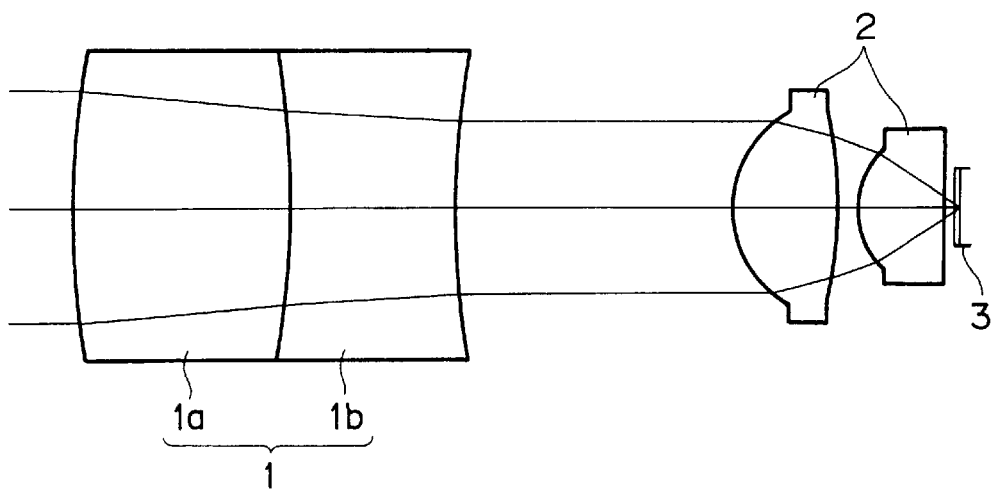
FIG. 9 is a schematic configuration view for showing an optical system in which another optical element for correcting a chromatic aberration of the present invention is arranged.
Figure 12A:
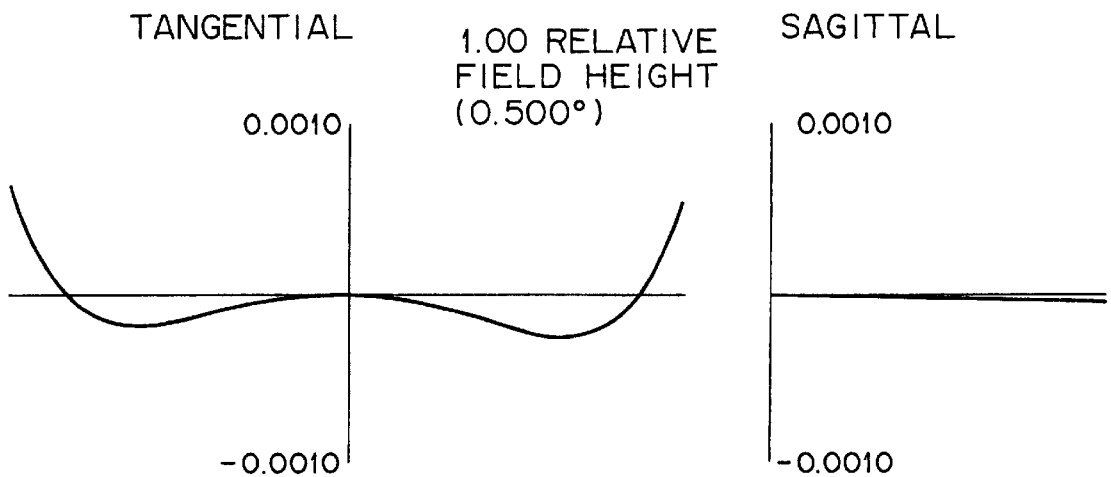
FIG. 12A shows a lateral aberration at an image angle of 0.5° in the schematic configuration view of the optical system of FIG. 9.
Figure 12B:
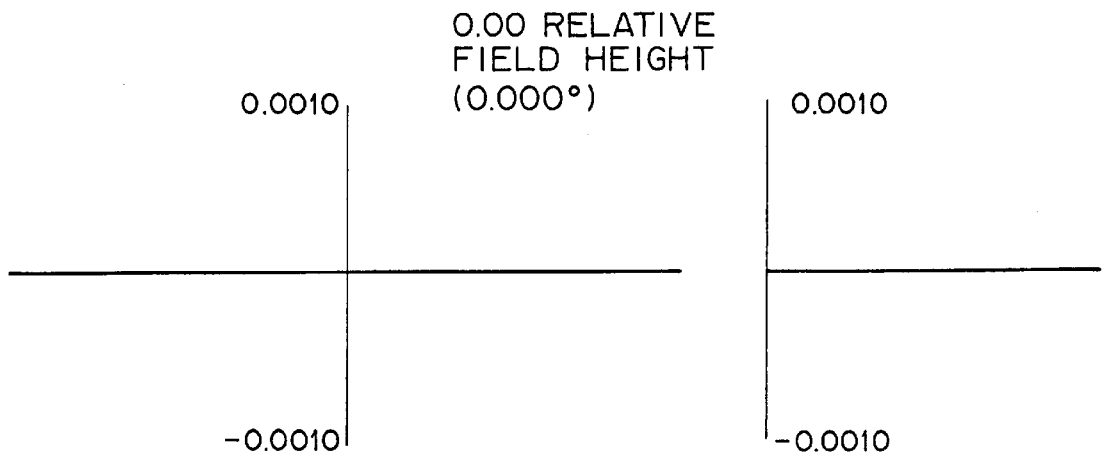
FIG. 12B shows a lateral aberration on axis in the schematic configuration view of the optical system of FIG. 9.

Referring next to FIG. 9 of a schematic configuration of the optical system, there will be described an example in which a wavelength of a light source is 440 nm or less, an objective 2 is composed of two lenses with NA being 0.70 or more, a focal distance being 1.4 mm or more and an Abbe number at the d-line being 95.0 or less, an optical element 1 for correcting a chromatic aberration of the present invention is arranged between the light source and the objective 2. In addition, in Tables 3 and 4 are indicated design values at a wavelength of 440 nm in the optical system in the schematic configuration figure of the optical system shown in FIG. 9 and at a wavelength of 650 nm in which the optical element 1 for correcting a chromatic aberration is not used, and a spherical aberration is shown in FIG. 11A, an astigmatism is shown in FIG. 11B, an aberration of distortion is shown in FIG. 11C, a lateral aberration at an image angle of 0.5° is shown in FIG. 12A and a lateral aberration on an axis is shown in FIG. 12B, respectively. In addition, as shown in FIG. 9, a reason why the objective 2 is composed of two lenses consists in the fact that it is quite hard to realize the objective 2 of a single lens with NA being 0.70 or higher in view of machining the lens.

The schematic configuration view of an optical system shown in FIG. 9 shows a so-called limitless optical system where an item point is positioned at a limitless far location, wherein the optical element 1 for correcting a chromatic aberration is arranged between a light source such as a semiconductor laser or the like (not shown) and an objective 2. The optical element 1 for correcting a chromatic aberration is comprised of two lenses in one group, wherein a convex lens 1a positioned at a side of the light source and a concave lens 1b positioned at a side of the objective 2 are adhered to each other. Then, the convex lens 1a is made of optical material having a low dispersion with an Abbe number at the d-line being 55 or more and the concave lens 1b is made of optical material having a high dispersion with an Abbe number at the d-line being 35 or less. With such an arrangement as above, a negative refraction force is provided by a refraction at an adhered plane between the convex lens 1a and the concave lens 1b and a refraction at a radiated plane (an opposing plane with the objective 2) of the concave lens 1b, resulting in that a high chromatic aberration is produced when a wavelength of the light source is varied. The chromatic aberration generated in this case has a polarity opposite to that of the chromatic aberration mainly generated with a positive refraction force of the objective 2, the chromatic aberration is cancelled when a focal point is attained and the chromatic aberration in an entire optical system can be well corrected within a range of variation of wavelength of the light source.

Figure 10:
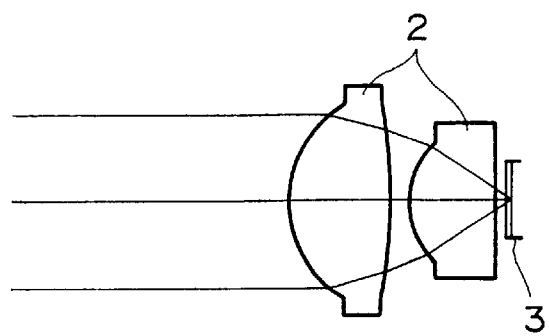
FIG. 10 is a schematic configuration view for showing an optical system in which an optical element for correcting a chromatic aberration is removed from the schematic .configuration view of an optical system in FIG. 9.

FIG. 10 is a schematic configuration view for showing an optical system in which an optical element 1 for correcting a chromatic aberration is removed from the schematic configuration view of an optical system in FIG. 9. In addition, in the schematic configuration view for showing an optical system shown in FIG. 10, a distribution of point image intensity under no variation of wavelength is shown in FIG. 13 and a distribution of point image intensity under a variation of wavelength of +5 nm is shown in FIG. 14.

Figure 14:
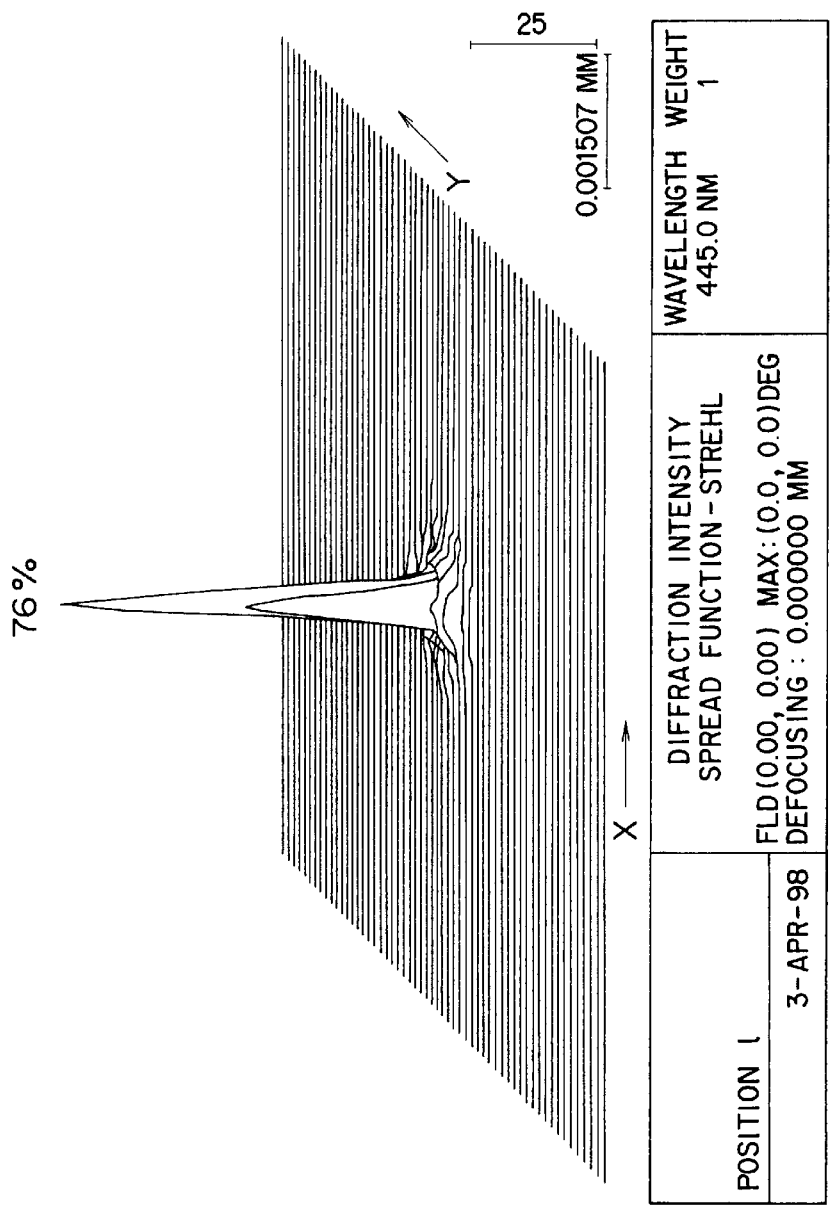
FIG. 14 is a view for showing an intensity distribution of point image in the schematic configuration view of the optical system of FIG. 10 when a variation in wavelength is +5 nm.

As apparent from FIG. 14, it is apparent that when the variation in wavelength is +5 nm, the center of the distribution of point image intensity is 76% smaller than 80% and then a chromatic aberration is required to be corrected. In addition, FIG. 16 is a graph for showing a variation of Strehl values when a wavelength is changed from −10 nm to +10 nm in respect to a central wavelength for a case in which a wavelength is 650 nm and a chromatic aberration is not corrected, a case in which a wavelength is 440 nm and a chromatic aberration is not corrected and a case in which a wavelength is 440 nm and a chromatic aberration is corrected, respectively.

Figure 16:
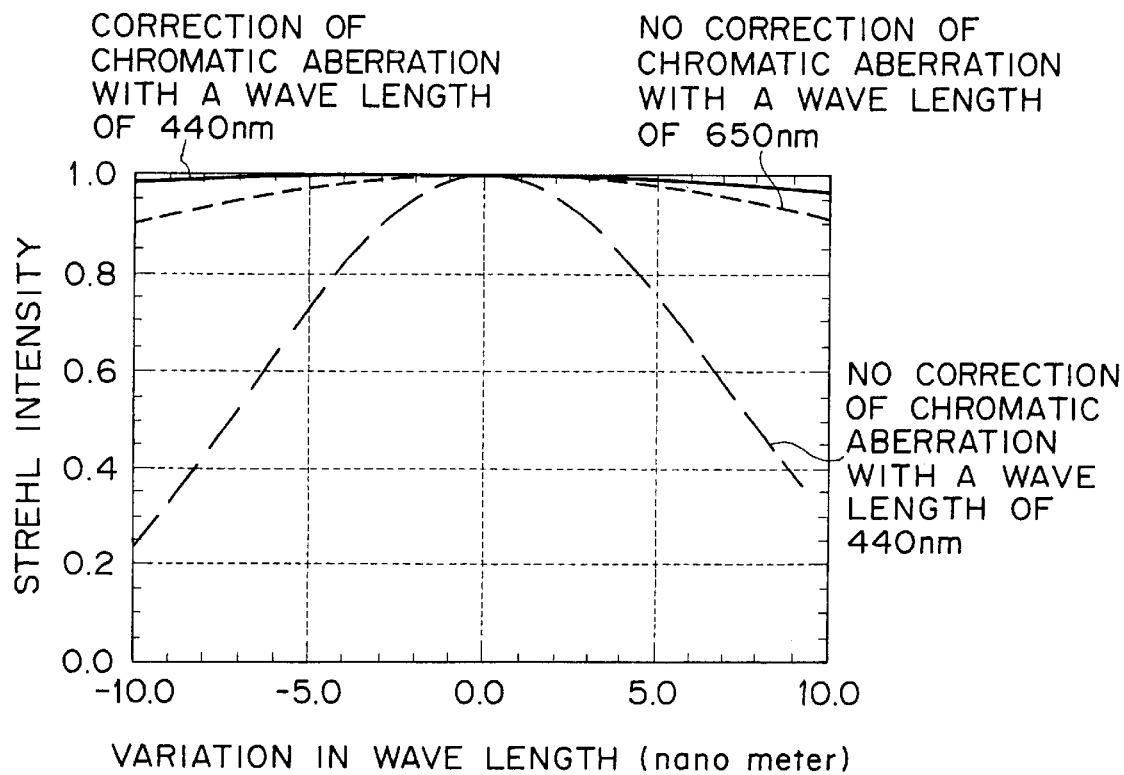
FIG. 16 is a graph for showing a variation of Strehl values when a wavelength is changed from −10 nm to +10 nm in respect to a central wavelength for a case in which a wavelength is 650 nm and a chromatic aberration is not corrected, a case in which a wavelength is 440 nm and a chromatic aberration is not corrected and a case in which a wavelength is 440 nm and a chromatic aberration is corrected, respectively.

As apparent from FIG. 16, it is apparent that if the wavelength is 650 nm, a correction of chromatic aberration is not required even if the wavelength is changed from −10 nm to +10 nm against the central wavelength, and to the contrary, when the wavelength is 440 nm, no correction of chromatic aberration causes a variation of ±5 nm or more to be 80% or less and then the chromatic aberration is required to be corrected.

Figure 15:
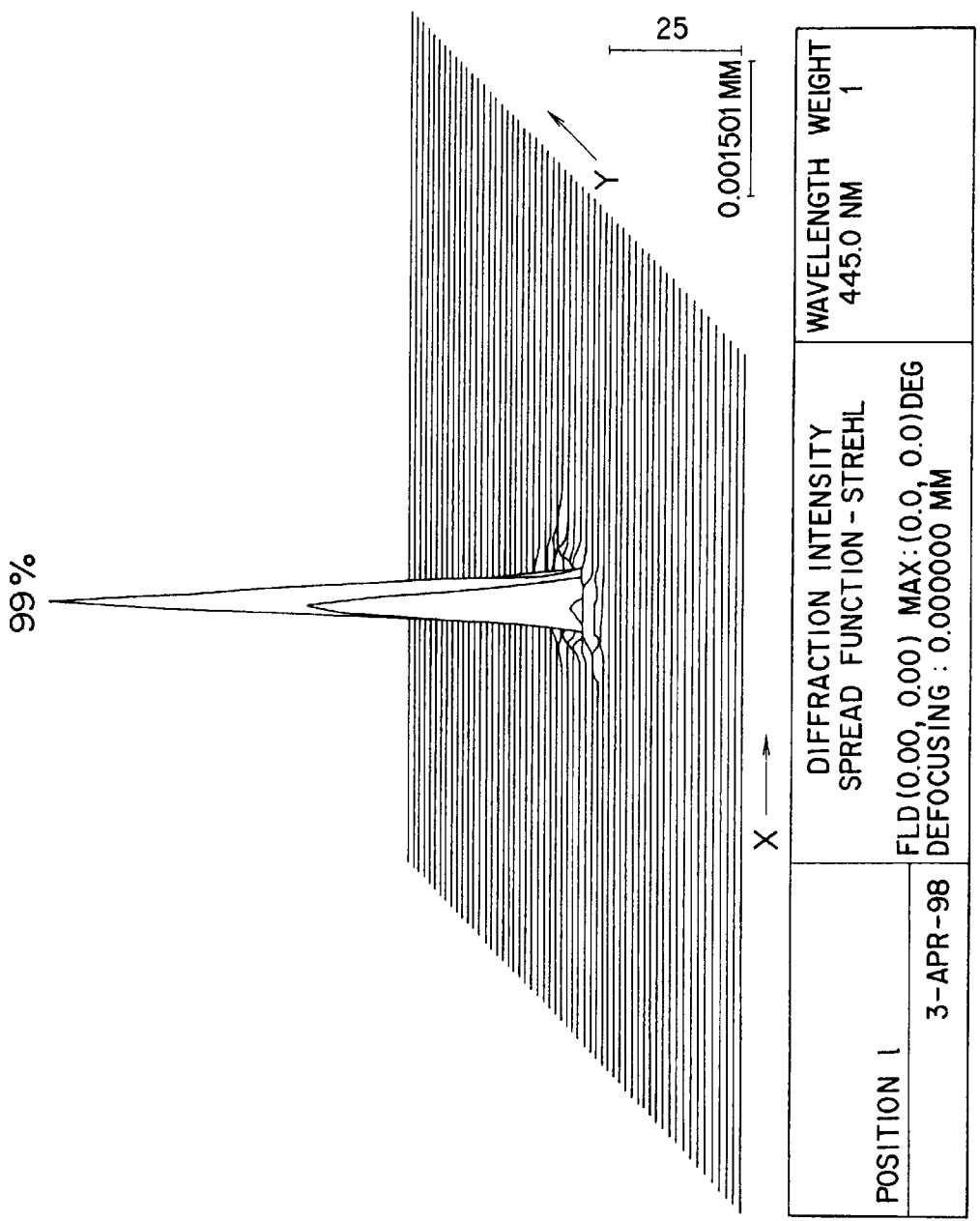
FIG. 15 is a view for showing an intensity distribution of point image in the schematic configuration view of the optical system of FIG. 9 when a variation in wavelength is +5 nm.

Then, it is apparent in the schematic configuration view for showing the optical system having the optical element 1 for correcting the chromatic aberration of the present invention arranged between the light source and the objective shown in FIG. 9 that a center of the distribution of point image intensity is 99% higher than 80% and it reaches sufficiently to a diffraction limit without producing any defocusing state as apparent from FIG. 15 for indicating the distribution of point image intensity when the variation in wavelength is +5 nm.

As shown in FIG. 10, the chromatic aberration of the objective 2 composed of two lenses is deteriorated as a wavelength is shorter, as a value of NA is larger, as a focal distance is longer or as an Abbe number of the optical material constituting the objective 2 is smaller. Accordingly, in reference to interface values of optical dimensions indicated in the schematic configuration view of FIG. 9, the objective 2 composed of two lenses having a light source with a wavelength being 440 nm or less, with a value of NA being 0.70 or more, with a focal distance being 1.4 mm and with an Abbe number at the d-line being 95.0 or less may generate a high chromatic aberration which can not be allowed. That is, as shown in the schematic configuration view of the optical system of FIG. 9, it is apparent that it is necessary to correct a chromatic aberration under application of the optical element 1 for correcting chromatic aberration.

Figure 19A:
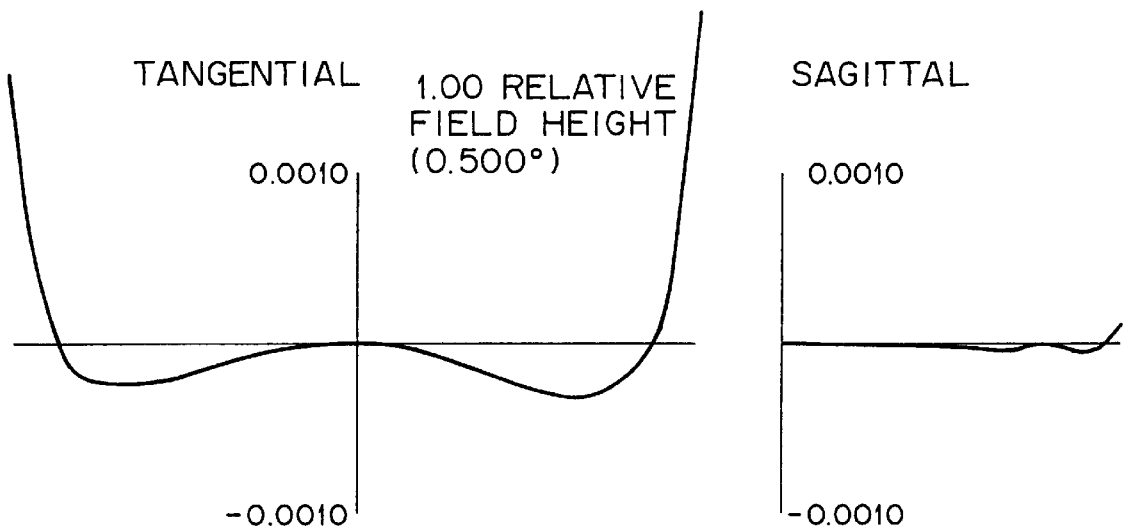
FIG. 19A shows a lateral aberration at an image angle of 0.5° in the schematic configuration view of the optical system of FIG. 17.
Figure 19B:
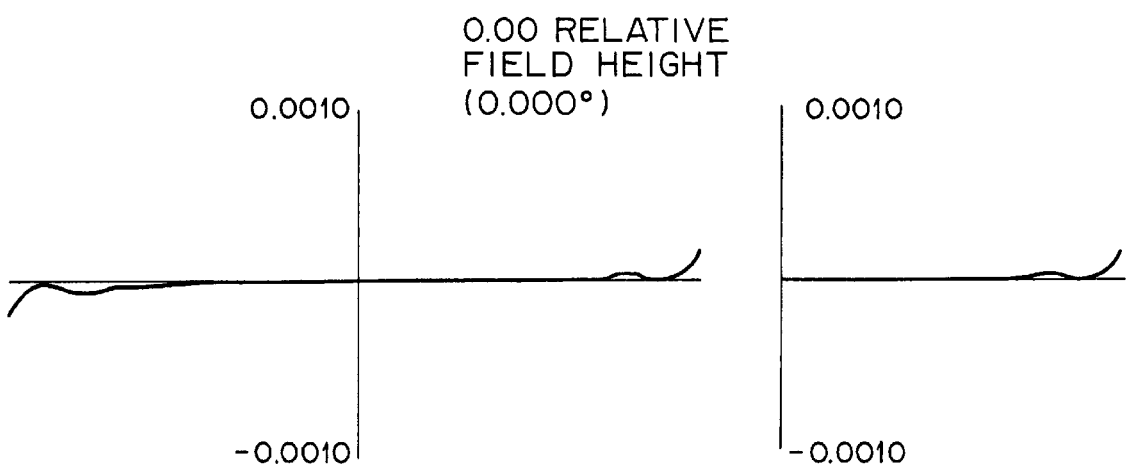
FIG. 19B shows a lateral aberration on axis in the schematic configuration view of the optical system of FIG. 17.

In the schematic configuration view of the optical system shown in FIG. 9, there has been illustrated the example of the configuration of the optical element 1 for correcting the chromatic aberration in which two lenses in one group are adhered from each other. However, it may also be applicable that as shown in the schematic configuration view of the optical system shown in FIG. 17, it may be composed of one or more lenses, the lenses are not adhered from each other and installed in spaced-apart relation. In Tables 5 and 6 are indicated design values at a wavelength of 410 nm in the optical system in the schematic configuration view of the optical system shown in FIG. 17 and at a wavelength of 650 nm in which the optical element 1 for correcting a chromatic aberration is not used, and a spherical aberration is shown in FIG. 18A, an astigmatism is shown in FIG. 18B, an aberration of distortion is shown in FIG. 18C, a lateral aberration at an image angle of 0.5° is shown in FIG. 19A and a lateral aberration on an axis is shown in FIG. 19B, respectively.

Figure 17:
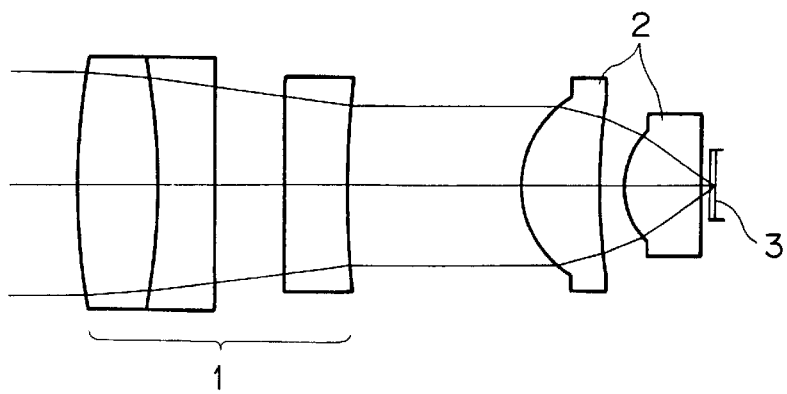
FIG. 17 is a schematic configuration view for showing an optical system in which a still further optical element for correcting a chromatic aberration of the present invention is arranged.
Figure 20:
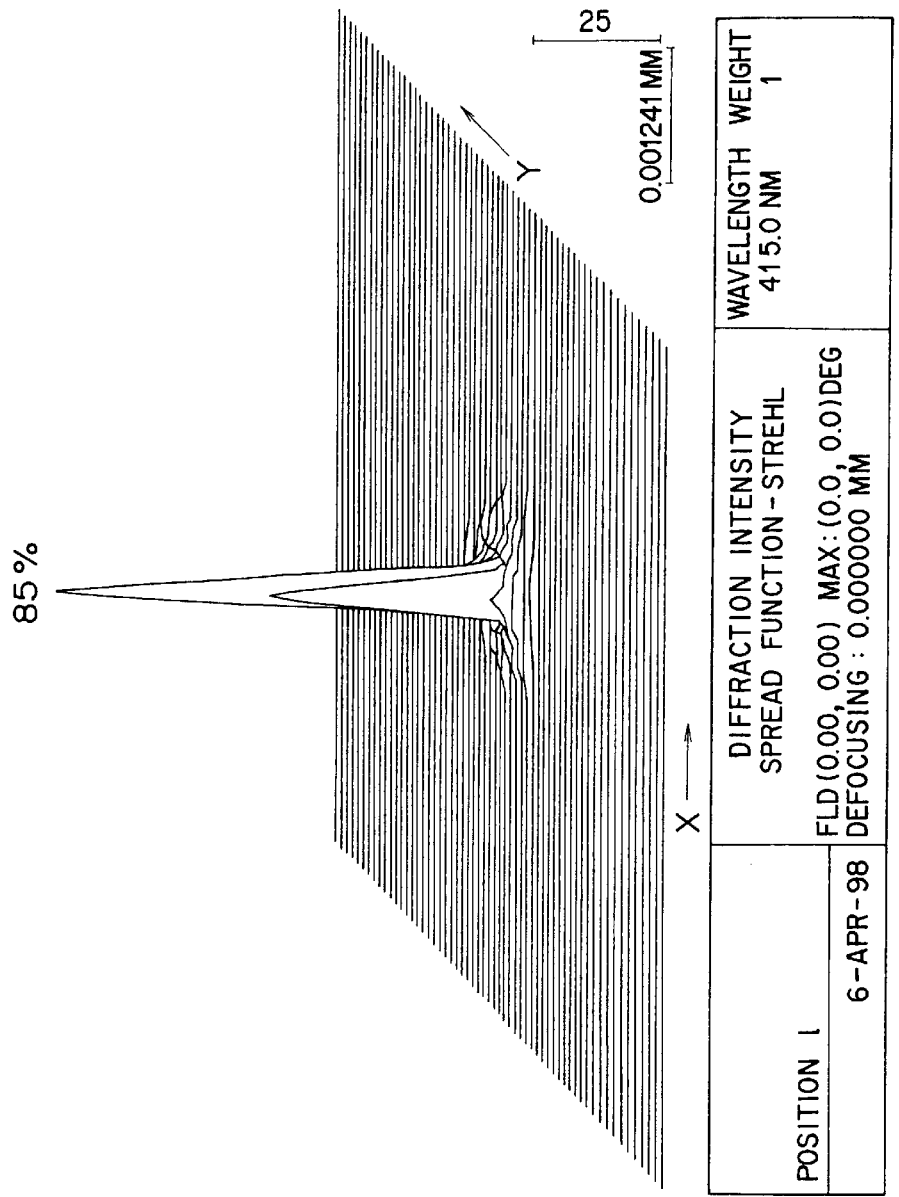
FIG. 20 is a view for showing an intensity distribution of point image in the schematic configuration view of the optical system of FIG. 17 when a variation in wavelength is +5 nm.
Figure 21:
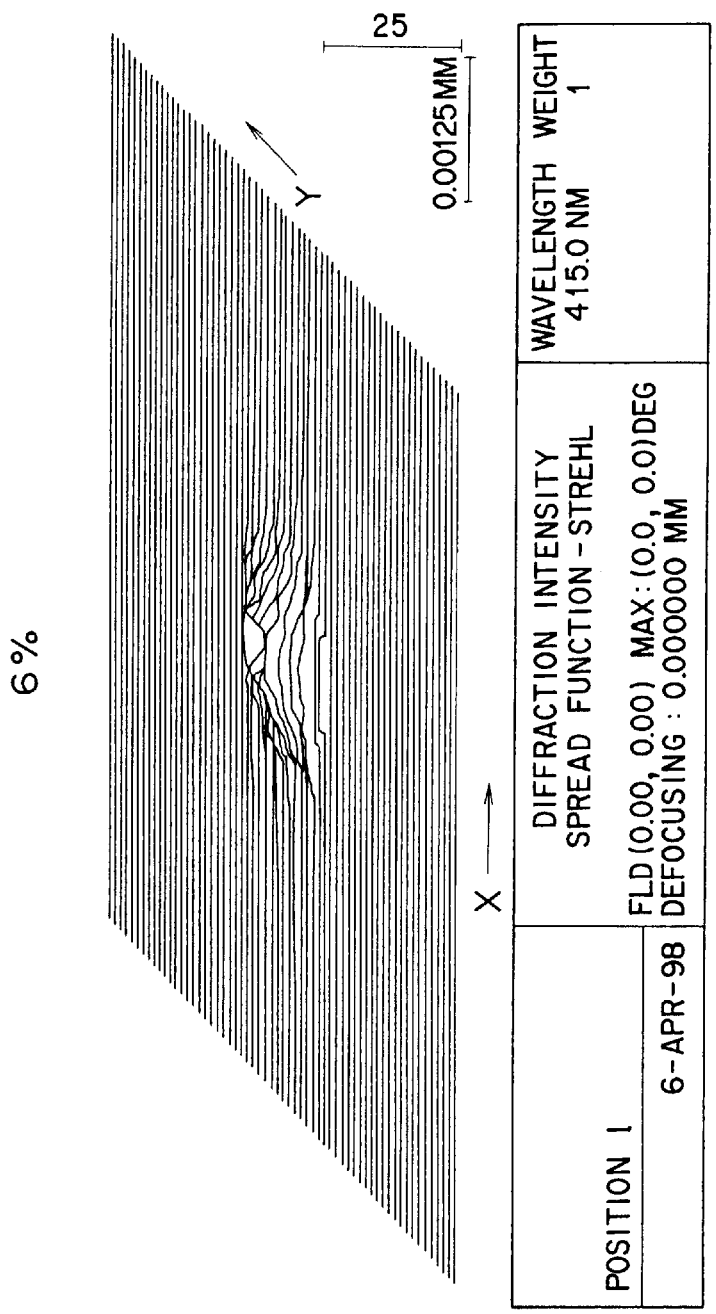
FIG. 21 is a view for showing an intensity distribution of point image in the schematic configuration view of the optical system of FIG. 17 when an optical element for correcting a chromatic aberration is not arranged and a variation in wavelength is +5 nm.

In the schematic configuration view of the optical system having the optical element 1 for correcting chromatic aberration of the present invention shown in FIG. 17, the distribution of point image intensity when a variation in wavelength is +5 nm is shown in FIG. 20. In addition, in FIG. 21 is shown an intensity distribution of point image when a variation in wavelength is +5 nm in an optical system in which an optical element 1 for correcting a chromatic aberration is removed from the schematic configuration view of the optical system of FIG. 17.

Also as apparent from FIG. 20, irrespective of application of the light source of short wavelength of 440 nm or less, occurrence of the chromatic aberration is restricted even if a variation in wavelength of +5 nm occurs and there is provided a superior optical property. That is, it is apparent that application of optical material with an Abbe number of 55 or more and optical material with an Abbe number of 35 or less in the optical element 1 for correcting a chromatic aberration causes the chromatic aberration generated at the objective 2 to be well corrected. To the contrary, as apparent from FIG. 21, in the case of the optical system in which an optical element 1 for correcting a chromatic aberration is removed from the schematic configuration view of the optical system of FIG. 17, it is apparent that a center of the distribution of point image intensity at the information recording surface 3a is 6% smaller than 80% and a sufficient converging spot may not be attained.

Figure 22:
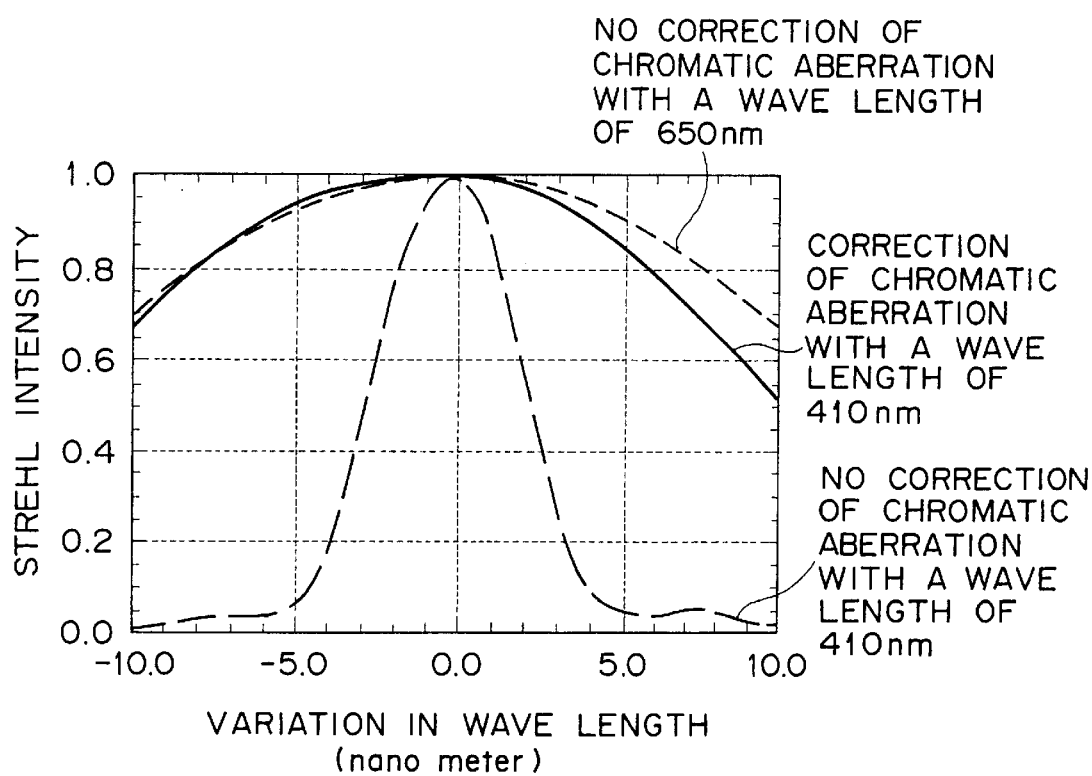
FIG. 22 is a graph for showing a variation of Strehl values when a wavelength is changed from −10 nm to +10 nm in respect to a central wavelength for a case in which a wavelength is 650 nm and a chromatic aberration is not corrected, a case in which a wavelength is 410 nm and a chromatic aberration is not corrected and a case in which a wavelength is 410 nm and a chromatic aberration is corrected, respectively.

In addition, FIG. 22 is a graph for showing a variation of Strehl values when a wavelength is changed from −10 nm to +10 nm in respect to a central wavelength for a case in which a wavelength is 650 nm and a chromatic aberration is not corrected, a case in which a wavelength is 410 nm and a chromatic aberration is not corrected and a case in which a wavelength is 410 nm and a chromatic aberration is corrected, respectively. As apparent from FIG. 22, it is apparent that when the wavelength is 650 nm, a correction of the chromatic aberration is not required, when the wavelength is 410 nm, no correction of the chromatic aberration causes the Strehl value to be less than 80% under a variation of ±5 nm or more and then the chromatic aberration is required to be corrected.

It is possible that the aforesaid optical element 1 for correcting a chromatic aberration may act as a collimator lens for use in converting a radiation light from the light source into a parallel light and in this case, it is possible to constitute the optical pick-up device for correcting the chromatic aberration without increasing the number of component parts.

Figures 24A, 24B, 24C:
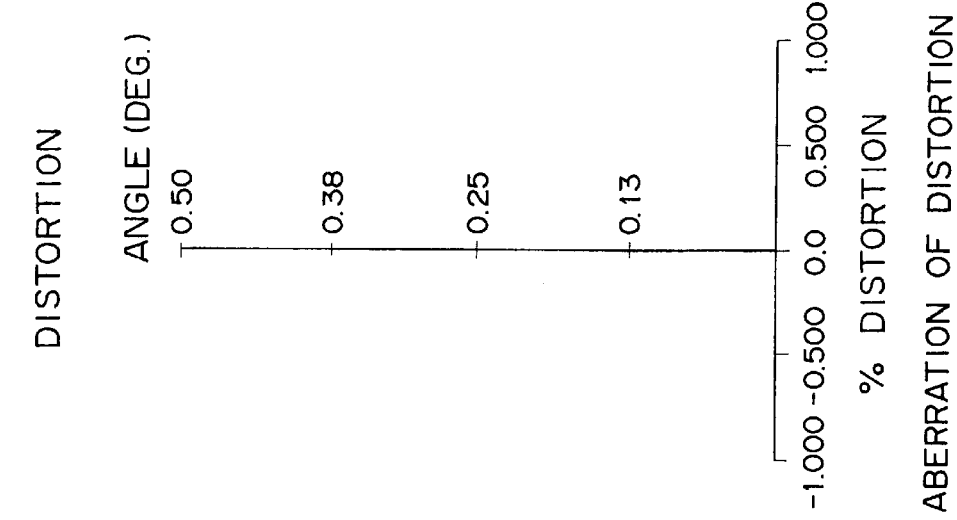
FIG. 24A shows a spherical aberration in the schematic configuration view of the optical system of FIG. 23.
FIG. 24B shows an astigmatism in the schematic configuration view of the optical system of FIG. 23.
FIG. 24C shows an aberration of distortion in the schematic configuration view of the optical system of FIG. 23.
Figure 25A:
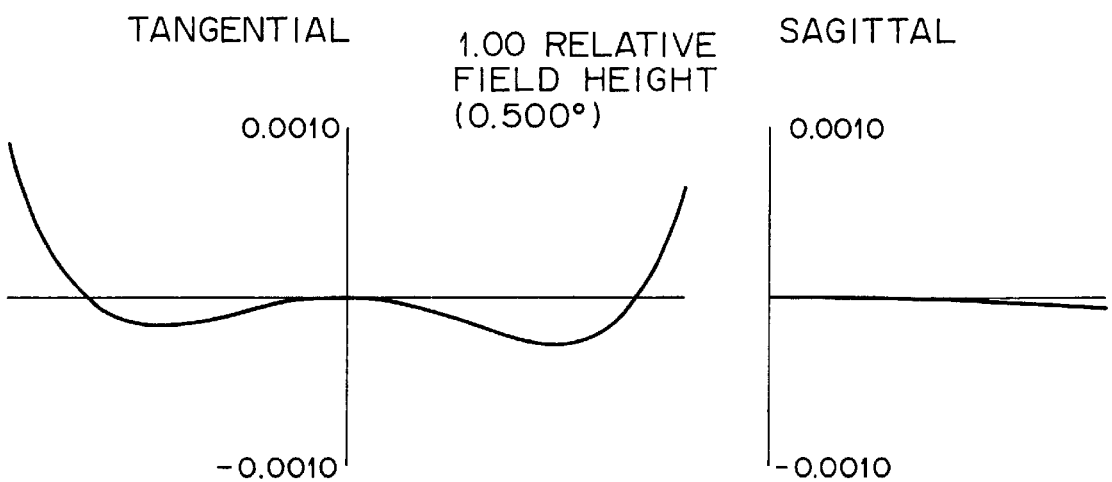
FIG. 25A shows a lateral aberration at an image angle of 0.5° in the schematic configuration view of the optical system of FIG. 23.
Figure 25B:
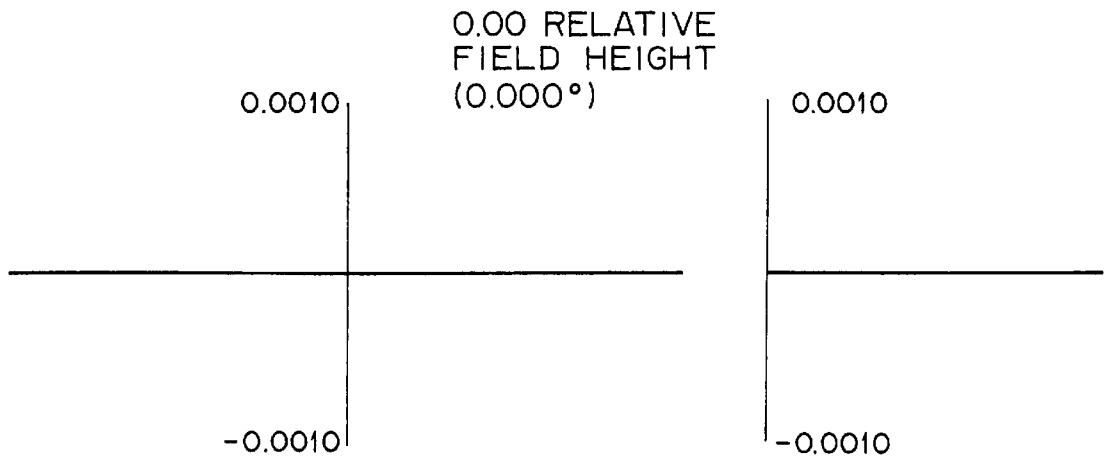
FIG. 25B shows a lateral aberration on axis in the schematic configuration view of the optical system of FIG. 23.

To the contrary, the position where the optical element 1 for correcting a chromatic aberration is not limited to a parallel flux of light, but it may be in a dispersed light or a converging light, as well. In this case, as shown in the schematic configuration view of the optical system of FIG. 23, a similar effect can be attained if the optical element 1 for correcting a chromatic aberration composed of more than one lenses and also acting as a collimator lens is arranged in the dispersion light. In Tables 7 and 8 are indicated design values at a wavelength of 440 nm in the optical system in the schematic configuration view of the optical system shown in FIG. 23 and at a wavelength of 650 nm in which the optical element 1 for correcting a chromatic aberration is not used, and a spherical aberration is shown in FIG. 24A, an astigmatism is shown in FIG. 24B, an aberration of distortion is shown in FIG. 24C, a lateral aberration at an image angle of 0.5° is shown in FIG. 25A and a lateral aberration on an axis is shown in FIG. 25B, respectively.

Figure 23:
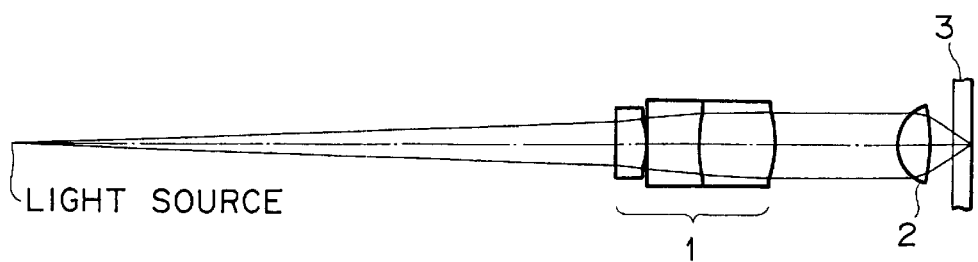
FIG. 23 is a schematic configuration view for showing an optical system in which an optical element for correcting a chromatic aberration of the present invention is arranged in dispersion light.
Figure 26:
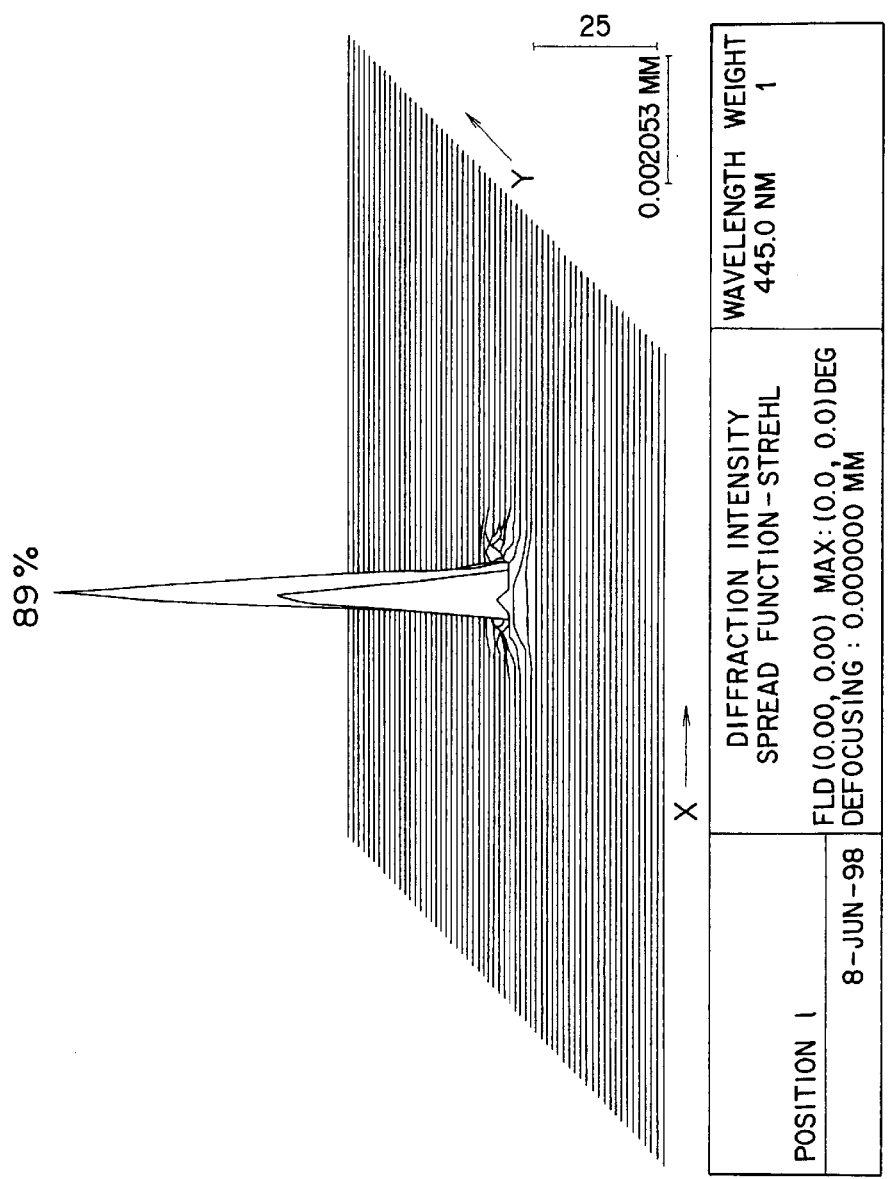
FIG. 26 is a view for showing an intensity distribution of point image in the schematic configuration view of the optical system of FIG. 23 when a variation in wavelength is +5 nm.
Figure 27:
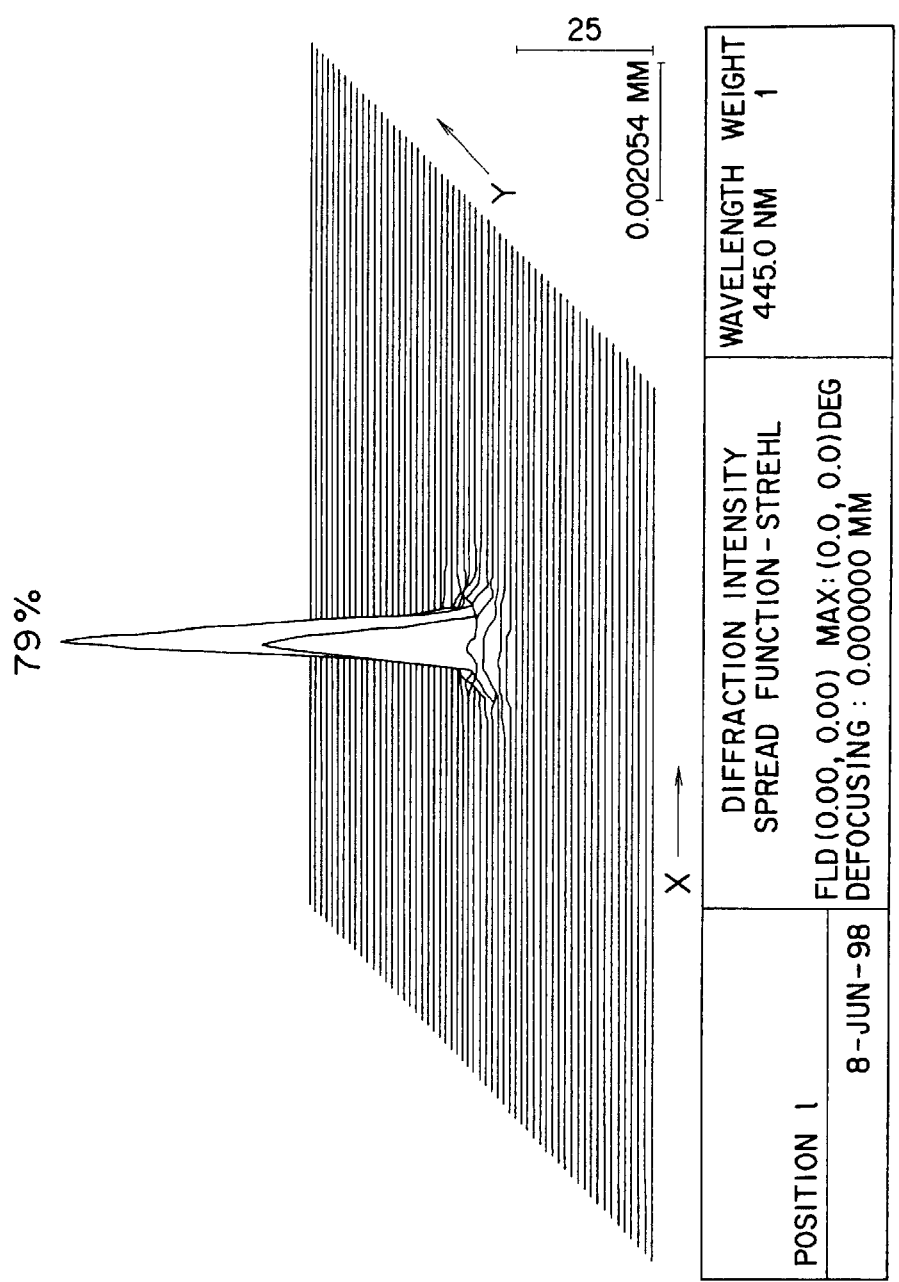
FIG. 27 is a view for showing an intensity distribution of point image in the schematic configuration view of the optical system of FIG. 23 when an optical element for correcting a chromatic aberration is not arranged and a variation in wavelength is +5 nm.

In the schematic configuration view of the optical system in which an optical element 1 for correcting a chromatic aberration shown in FIG. 23, an intensity distribution of point image when a variation in wavelength is +5 nm is shown in FIG. 26. In FIG. 27 is shown an intensity distribution of point image when a variation in wavelength is +5 nm in the schematic configuration view of the optical system in which an optical element 1 for correcting a chromatic aberration is removed from the schematic configuration view of the optical system of FIG. 23.

Also as apparent from FIG. 26, irrespective of application of the light source of short wavelength of 440 nm or less in this optical system, a center of the distribution of the point image intensity is 89% higher than 80% even if a variation in wavelength of +5 nm occurs, occurrence of chromatic aberration is restricted, resulting in that a superior optical property is provided. That is, it is apparent that application of optical material with an Abbe number of 55 or more and optical material with an Abbe number of 35 or less in the optical element 1 for correcting a chromatic aberration causes the chromatic aberration generated at the objective 2 to be well corrected. To the contrary, as apparent from FIG. 27, it is apparent that a center of the distribution of point image intensity at the information recording surface 3a is 79% smaller than 80% due to occurrence of chromatic aberration at the objective 2 and defocusing and a sufficient converging spot may not be attained.

Figure 28:
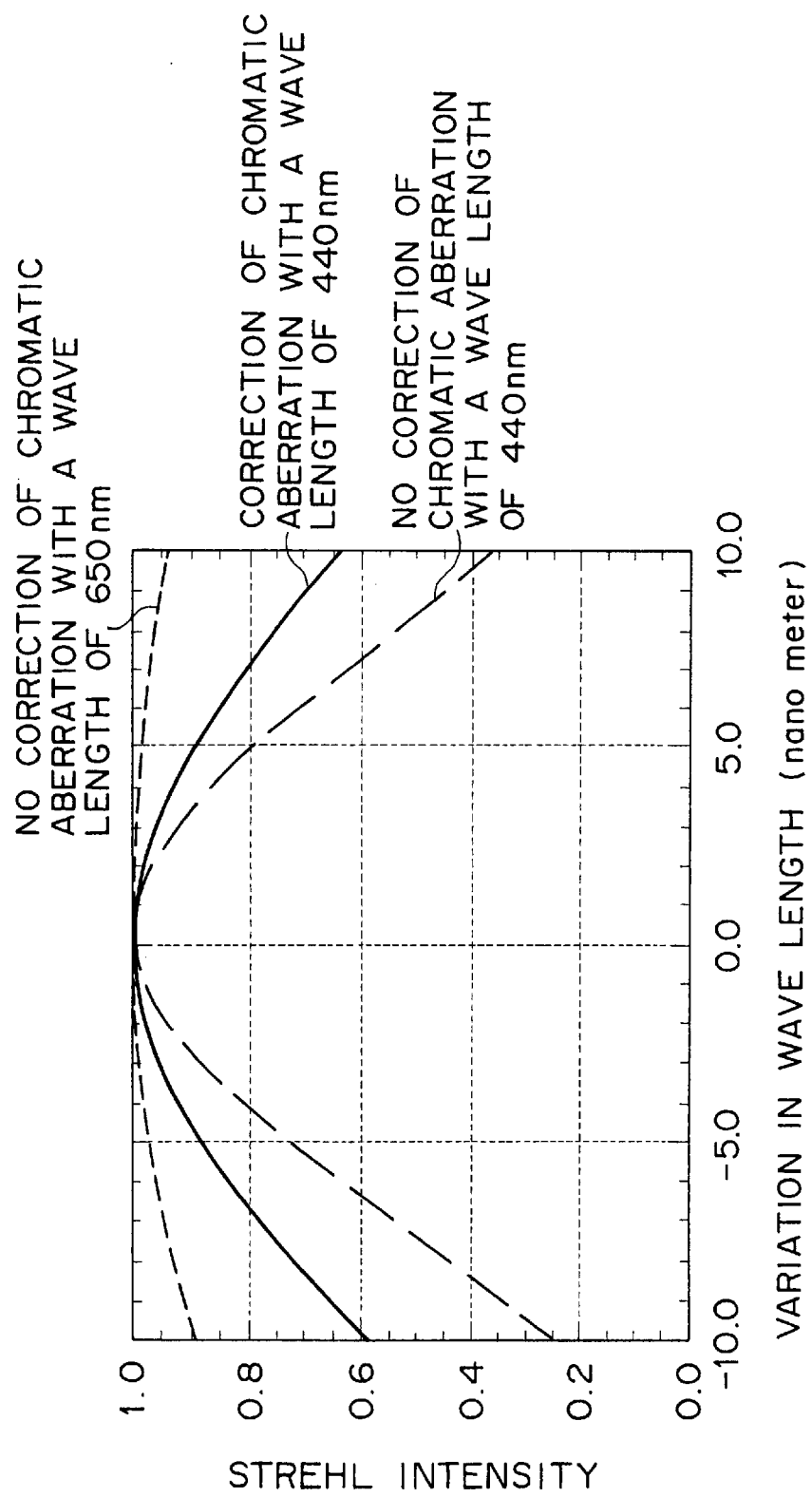
FIG. 28 is a graph for showing a variation of Strehl values when a wavelength is changed from −10 nm to +10 nm in respect to a central wavelength for a case in which a wavelength is 650 nm and a chromatic aberration is not corrected, a case in which a wavelength is 440 nm and a chromatic aberration is not corrected and a case in which a wavelength is 440 nm and a chromatic aberration is corrected, respectively.

In addition, FIG. 28 is a graph for showing a variation of Strehl values when a wavelength is changed from −10 nm to +10 nm in respect to a central wavelength for a case in which a wavelength is 650 nm and a chromatic aberration is not corrected, a case in which a wavelength is 440 nm and a chromatic aberration is not corrected and a case in which a wavelength is 440 nm and a chromatic aberration is corrected, respectively. As apparent from FIG. 28, it is apparent that in the case of wavelength of 650 nm or less, no correction of the chromatic aberration is required and to the contrary, in the case of wavelength of 440 nm, no correction of the chromatic aberration causes the Strehl value to become 80% or less under a variation of ±5 nm or more and the chromatic aberration is required to be corrected.

Figure 29:
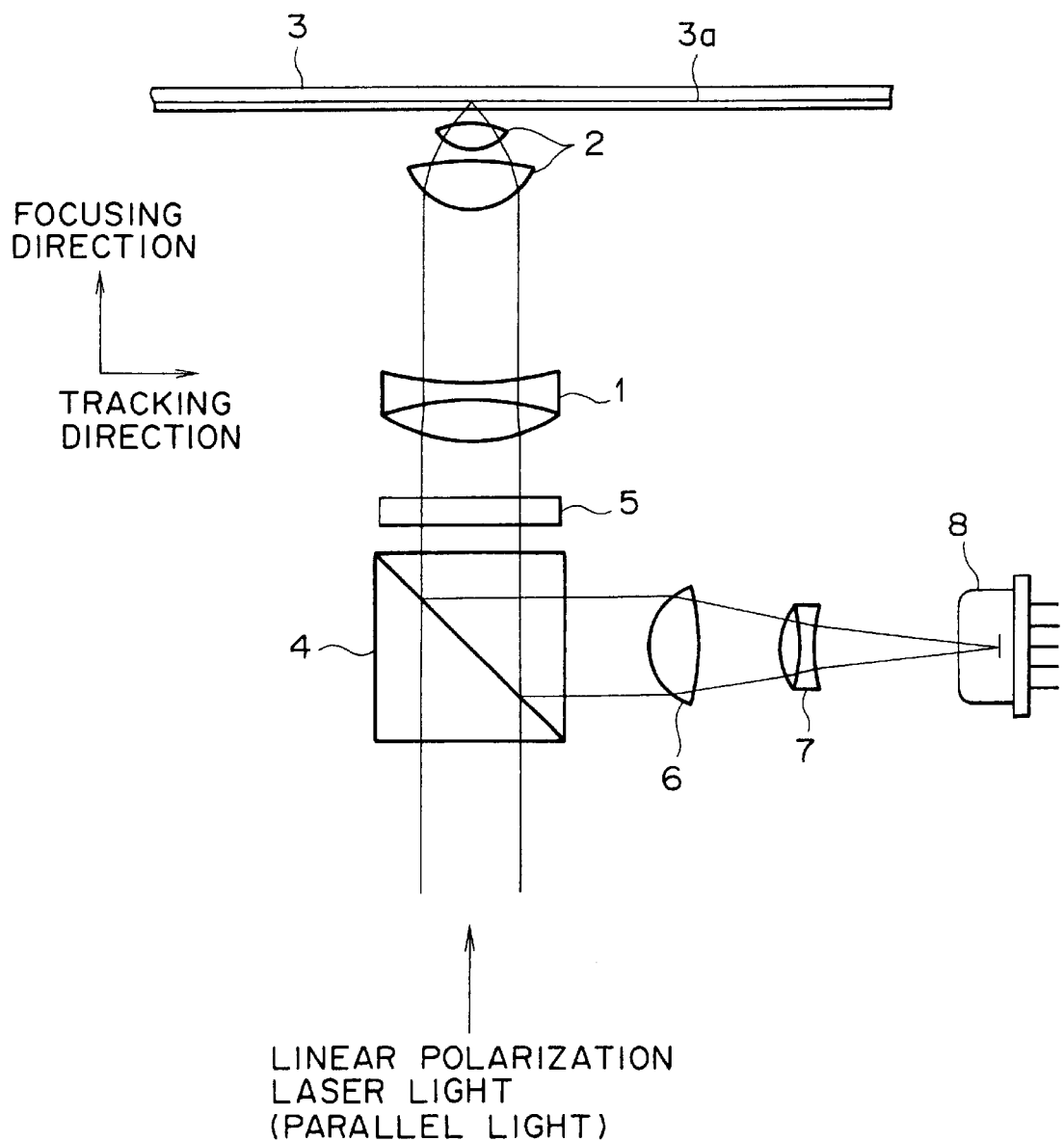
FIG. 29 is a schematic configuration view for showing an optical pick-up device of the present invention.

Next, referring to FIG. 29, the optical pick-up device provided with the optical element 1 for correcting a chromatic aberration of the present invention shown in FIGS. 1, 9, 17 and 23 will be described. In FIG. 29 is illustrated an example in which the optical element 1 for correcting a chromatic aberration shown in the schematic configuration view of the optical system of FIG. 9 as a representative one and the objective 2 are used. However, it is of course apparent that the optical element 1 for correcting a chromatic aberration shown in the schematic configuration view of FIGS. 1, 17 and 23 and the objective 2 may be used.

A linear deflecting beam with a wavelength of 440 nm is radiated from a light source (not shown) constituting the optical pick-up device, for example, a semiconductor laser or the like and diffracted at a diffraction grid (not shown), the beam is divided into a 0-th light and ±primary light, for example, these lights are converted into parallel lights through the collimator lens (not shown). The linear deflecting beam converted into the parallel light passes through a deflecting beam splitter 4, the linear deflecting beam is converted into a circular deflected beam at a ¼ wavelength plate 5 and this beam may pass through the optical element 1 for correcting a chromatic aberration. At this time, in the case that a variation in wavelength is produced at the linear deflecting beam with a wavelength of 440 nm radiated from the semiconductor laser, a chromatic aberration having a polarity opposite to that of a chromatic aberration generated with a positive refraction force of the objective 2 is produced at the optical element 1 for correcting a chromatic aberration, resulting in that a chromatic aberration at the converging spot radiated against the information recording surface 3a is cancelled. The circular deflected beam passed through the optical element 1 for correcting a chromatic aberration is converged into the signal recording surface 3a of the optical recording medium 3 through the objective 2.

The circular deflected beam radiated against the information recording surface 3a of the optical recording medium 3 may pass through the objective 2 and the optical element 1 for correcting a chromatic aberration and is converted into a linear deflected beam with its deflecting direction being turned by 90° against the going linear deflected beam at the ¼ wavelength plate 5. The linear deflected beam with its deflecting direction being turned by 90° in respect to the going linear deflected beam is reflected by the deflected beam splitter 4, it may pass through a focusing lens 6 and a multi-flex lens 7 and is collected at an optical sensor 8. This optical sensor 8 has a plurality of divided light receiving elements, a calculating processing is carried out in response to an amount of light of the 0-th light and the ± primary light radiated against the plurality of divided light receiving elements so as to detect a focusing error signal, a tracking error signal and an RF signal or the like. The objective 2 is installed at the double-axis actuator for controlling and driving the objective 2 in a focusing direction and a tracking direction, respectively, wherein the feed-back servo such as a focusing servo and a tracking servo is carried out by the control signal based on the focusing error signal and the tracking error signal described above.

The optical pick-up device provided with the aforesaid optical element 1 for correcting a chromatic aberration may perform a sufficient correction of the chromatic aberration even under a high frequency overlapping with the light source of short wavelength of about 440 nm or 440 nm or less and also perform a sufficient correction of a chromatic aberration even if the mode hopping is produced, so that it is possible to adapt for a high recording density and high capacity of the optical recording medium 3.

Figure 30:
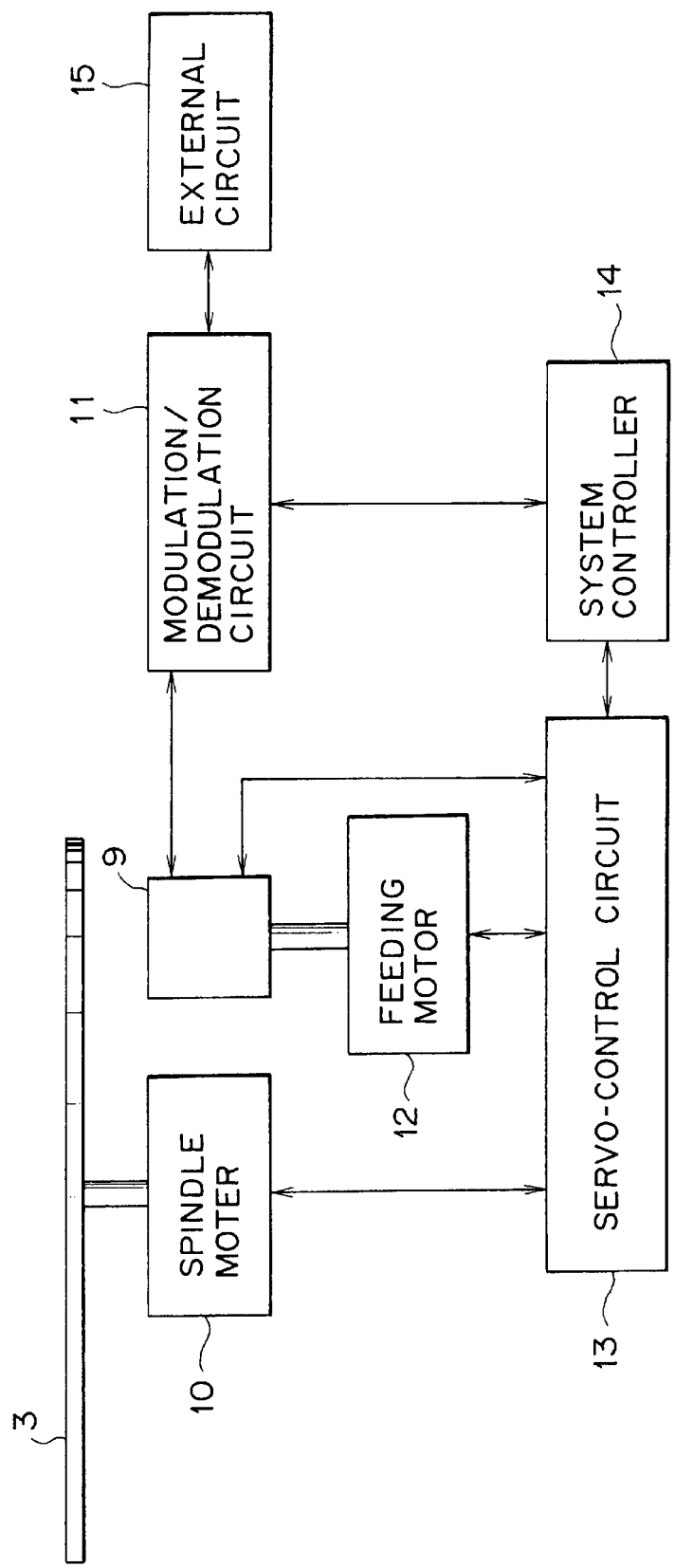
FIG. 30 is a schematic configuration view for showing an optical recording and reproducing device of the present invention.

Then, referring to FIG. 30 representing to show the schematic configuration of the optical recording and reproducing device, the optical reproducing device provided with the aforesaid optical pick-up device and the optical recording and reproducing device will be described as follows.

The optical recording and reproducing device is generally comprised of a spindle motor 10, a feeding motor 12 and an optical pick-up device 9 or the like, wherein these devices are controlled by a system controller 14 for use in controlling an entire optical recording and reproducing device. Then, motion of the optical pick-up device toward the tracking direction is carried out by a controlling and driving means composed of a guiding mechanism (not shown) and the feeding motor 12 constituted by a linear motor or the like. For example, in the case that the optical recording medium 3 held at the spindle motor 10 is to be reproduced, a control signal from the system controller 14 is supplied to a servo control circuit 13 and a modulation/demodulation circuit 11. At the servo control circuit 13 to which the control signal is supplied, the spindle motor 10 is rotated at the number of rotation set under a focusing drawing state and at the same time, the feeding motor 12 is driven and the optical pick-up device 9 is moved to the inner circumferential side of the optical recording medium 3, for example. At the optical pick-up device 9 moved to the inner circumferential side of the optical recording medium 3, the focusing servo is applied under a focusing search operation and after this operation, the tracking servo is applied.

The focusing error signal, the tracking error signal detected by the optical sensor constituting the optical pick-up device 9 and information about a position of what location of the optical recording medium 3 is read out are supplied to the modulation/demodulation circuit 11. The focusing error signal and the tracking error signal in these signals are processed through filtering and then supplied to the servo control circuit 13 through a system controller 14 as a focusing control signal and a tracking control signal. The servo control circuit 13 drives a focusing coil of the double-axis actuator, for example, constituting the optical pick-up device 9 with the focusing control signal, and then drives a tracking coil of the double-axis actuator constituting the optical pick-up device 9 with a tracking control signal. A low range component of the tracking control signal is supplied to the servo control circuit 13 through the system controller 14 to drive the feeding motor 12. With such an arrangement as above, the feed-back servo such as the focusing servo, the tracking servo and the feeding servo are carried out. In addition, information about a position on what location of the optical recording medium 3 is read out is processed by the modulation/demodulation circuit 11, supplied to the spindle motor 10 as the spindle control signal, it is controlled and driven at a predetermined number of rotation corresponding to the reproducing position of the optical recording medium 3 held by the spindle motor 10 and a practical reproducing operation is carried out from this position. Then, the reproduced data processed and demodulated by the modulating/demodulating circuit 11 is transmitted to the external system through the external circuit 15.

In the case that the external data supplied from the external system, for example, is recorded in the optical recording medium 3 held by the spindle motor 10, a similar process for the reproducing operation is carried out until the feed-back servo such as the focusing servo, the tracking servo and the feeding servo are performed. From the system controller 14 is supplied a control signal for recording an input data inputted through the external circuit 15 in what location of the optical recording medium 3 to the servo control circuit 13 and the modulating/demodulating circuit 11. At the servo control circuit 13, the spindle motor 10 is controlled to a predetermined number of rotation, the feeding motor 12 is driven and then the optical pick-up device 9 is moved to the information recording position. In addition, the input signal inputted to the modulating/demodulating circuit 11 is modulated in response to a recording format at the modulating/demodulating circuit 11 and then it is supplied to the optical pick-up device 9. At the optical pick-up device 9, the modulation of the radiated light based on the modulating signal and the radiated light power based on the information recording position are controlled and then radiated against the optical recording medium 3 and the recording for the optical recording medium 3 is started. In addition, in the case of a so-called CAV (Constant Angular Velocity) disc in which the optical recording medium 3 is recorded and reproduced under a constant number of rotation, information about a position on what location of the optical recording medium 3 is being read out is not required and the spindle motor 10 is controlled to have a specified number of rotation.

If the optical element 1 for correcting a chromatic aberration of the present invention is constructed to have the exclusive optical reproducing device and the optical recording and reproducing device capable of performing both recording and reproducing operations, a chromatic aberration generated by the mode hopping at the light source or an overlapping of high frequency of the semiconductor laser acting as a light source, in particular, a chromatic aberration generated when a short wavelength of about 440 nm or 440 nm or less is applied in the light source can be effectively corrected and the present invention can be adapted for a far higher density and high capacity of the optical recording medium 3.

In accordance with the optical element for correcting a chromatic aberration of the present invention, it is possible to perform a sufficient correction of the chromatic aberration mainly generated at the objective in the case that the light source of short wavelength of 440 nm or less is applied. Then, since the optical pick-up device constituting an optical system by the optical element for correcting the chromatic aberration and the light source of short wavelength, an optical reproducing device provided with the optical pick-up device and the optical recording and reproducing device may have a sufficient correction of the chromatic aberration, the present invention can adapt for a further higher recording density and larger capacity of the optical recording medium.

TABLE 1

| | | | Wave length λ = 440 nm | |
|---|---|---|---|---|
| NA/Focal distance/Entrance pupilφ of objective (0.55/1.8 mm/1.98 mm) | | Axial clearance | Refractive index ND/Aberration number | Refractive index N at |
| Surface | Radius of curvature (mm) | (mm) | νd at a line d | 440 nm |
| OBJ | ∞ | ∞ | | |
| STO | ∞ | 0.0 | | |
| S1 | R: 6.58      C: 0.0 | 2.0 | 1.5168/64.17 | 1.526269 |
|    | K: 0.0       D: 0.0 | | | |
|    | A: 0.0       E: 0.0 | | | |
|    | B: 0.0       F: 0.0 | | | |
| S2 | R: −9.68034  C: 0.0 | 1.6 | 1.75520/27.58 | 1.789557 |
|    | K: 0.0       D: 0.0 | | | |
|    | A: 0.0       E: 0.0 | | | |
|    | B: 0.0       F: 0.0 | | | |
| S3 | R: 12.0      C: 0.0 | 3.0 | | |
|    | K: 0.0       D: 0.0 | | | |
|    | A: 0.0       E: 0.0 | | | |
|    | B: 0.0       F: 0.0 | | | |
| S4 | R: 1.02246   C: −.104969E−2 | 1.1 | 1.438750/95.0 | 1.443854 |
|    | K: −0.700344 D: −.713744E−3 | | | |
|    | A: 0.521041E−2 E: 0.0 | | | |
|    | B: −.160629E−2 F: 0.0 | | | |
| S5 | R: −2.44588  C: 0.195359E−1 | 0.0 | | |
|    | K: 0.0       D: −445800E−2 | | | |
|    | A: 0.917902E−1 E: 0.0 | | | |
|    | B: −.439814E−1 F: 0.0 | | | |
| S6 | ∞ | 0.0 | | |
| S7 | ∞ | 0.0 | | |
| S8 | ∞ | 0.0 | | |
| S9 | ∞ | 0.811592 | | |
| S10 | ∞ | 0.6 | 1.5168/64.17 | 1.526269 |
| S11 | ∞ | 0.0 | | |
| IMG | ∞ | 0.0 | | |

Nonspherical surface equation $$X = \frac{Y^2 R}{1 + \{1 - (1+k)(Y/R)^2\}^{1/2}} + AY^4 + BY^6 + CY^8 + DY^{10} + EY^{12} + FY^{14}$$

X: Depth from an apex of surface
Y: Height from an optical axis
R: Proximal axis R
K: Circular cone constant
A: Coefficient of nonspherical surface of a term $Y^4$
B: Coefficient of nonspherical surface of a term $Y^6$
C: Coefficient of nonspherical surface of a term $Y^8$
D: Coefficient of nonspherical surface of a term $Y^{10}$
E: Coefficient of nonspherical surface of a term $Y^{12}$
F: Coefficient of nonspherical surface of a term $Y^{14}$

TABLE 2

| | | | Wave length λ = 650 nm | |
|---|---|---|---|---|
| NA/Focal distance/Entrance pupilφ of objective (0.55/1.8 mm/1.98 mm) | | Axial clearance | Refractive index ND/Aberration number | Refractive index N at |
| Surface | Radius of curvature (mm) | (mm) | νd at a line d | 650 nm |
| OBJ | ∞ | ∞ | | |
| STO | ∞ | 0.0 | | |
| S1 | R: 1.01107  C: −.104969E−2<br>K: −0.700344  D: −.713744E−3<br>A: 0.521041E−2  E: 0.0<br>B: .160629E−2  F: 0.0 | 1.040991 | 1.438750/95.0 | 1.437364 |
| S2 | R: −2.4422  C: 0.195359E−1<br>K: 0.0  D: −445800E−2<br>A: 0.917902E−1  E: 0.0<br>B: −.439814E−1  F: 0.0 | 0.0 | | |
| S3 | ∞ | 0.0 | | |
| S4 | ∞ | 0.0 | | |
| S5 | ∞ | 0.0 | | |
| S6 | ∞ | 0.0 | | |
| S7 | ∞ | 0.0 | | |
| S8 | ∞ | 0.0 | | |
| S9 | ∞ | 0.839873 | | |
| S10 | ∞ | 0.6 | 1.5168/64.17 | 1.514523 |
| S11 | ∞ | 0.0 | | |
| IMG | ∞ | 0.0 | | |

Nonspherical surface equation $$X = \frac{Y^2 R}{1 + \{1 - (1+k)(Y/R)^2\}^{1/2}} + AY^4 + BY^6 + CY^8 + DY^{10} + EY^{12} + FY^{14}$$

X: Depth from an apex of surface
Y: Height from an optical axis
R: Proximal axis R
K: Circular cone constant
A: Coefficient of nonspherical surface of a term $Y^4$
B: Coefficient of nonspherical surface of a term $Y^6$
C: Coefficient of nonspherical surface of a term $Y^8$
D: Coefficient of nonspherical surface of a term $Y^{10}$
E: Coefficient of nonspherical surface of a term $Y^{12}$
F: Coefficient of nonspherical surface of a term $Y^{14}$

TABLE 3

| | | | Wave length λ = 440 nm | |
|---|---|---|---|---|
| NA/Focal distance/Entrance pupilφ of objective (0.7/1.4 mm/1.96 mm) | | Axial clearance | Refractive index ND/Aberration number | Refractive index N at |
| Surface | Radius of curvature (mm) | (mm) | νd at a line d | 440 nm |
| OBJ | ∞ | ∞ | | |
| STO | ∞ | 0.0 | | |
| S1 | R: 6.58  C: 0.0<br>K: 0.0  D: 0.0<br>A: 0.0  E: 0.0<br>B: 0.0  F: 0.0 | 2.0 | 1.5168/64.17 | 1.526269 |
| S2 | R: −9.68066  C: 0.0<br>K: 0.0  D: 0.0<br>A: 0.0  E: 0.0<br>B: 0.0  F: 0.0 | 1.6 | 1.75520/27.58 | 1.789557 |
| S3 | R: 12.0  C: 0.0<br>K: 0.0  D: 0.0<br>A: 0.0  E: 0.0<br>B: 0.0  F: 0.0 | 3.0 | | |
| S4 | R: 1.13382  C: −.629383E−3<br>K: −0.40865  D: −.394777E−2<br>A: −.220593E−1  E: 0.0<br>B: −.133861E−1  F: 0.0 | 1.047744 | 1.438750/95.0 | 1.443854 |
| S5 | R: −8.82788  C: −.109225E−3<br>K: 0.0  D: 0.168193E−2<br>A: −.155426E−1  E: 0.0<br>B: −.155166E−1  F: 0.0 | 0.2 | | |
| S6 | R: 0.97559  C: −.641939E−1<br>K: −0.377658  D: 0.0<br>A: 0.473800E−1  E: 0.0<br>B: 0.436903E−1  F: 0.0 | 1.0 | 1.438750/95.0 | 1.443854 |

TABLE 3-continued

| | | Wave length λ = 440 nm | | |
|---|---|---|---|---|
| NA/Focal distance/Entrance pupilϕ of objective (0.7/1.4 mm/1.96 mm) | | Axial clearance | Refractive index ND/Aberration number | Refractive index N at |
| Surface | Radius of curvature (mm) | (mm) | vd at a line d | 440 nm |
| S7 | ∞ | 0.0 | | |
| S8 | ∞ | 0.0 | | |
| S9 | ∞ | 0.124481 | | |
| S10 | ∞ | 0.1 | 1.5168/64.17 | 1.526269 |
| S11 | ∞ | 0.0 | | |
| IMG | ∞ | 0.0 | | |

Nonspherical surface equation $$X = \frac{Y^2 R}{1 + \{1 - (1+k)(Y/R)^2\}^{1/2}} + AY^4 + BY^6 + CY^8 + DY^{10} + EY^{12} + FY^{14}$$

X: Depth from an apex of surface
Y: Height from an optical axis
R: Proximal axis R
K: Circular cone constant
A: Coefficient of nonspherical surface of a term $Y^4$
B: Coefficient of nonspherical surface of a term $Y^6$
C: Coefficient of nonspherical surface of a term $Y^8$
D: Coefficient of nonspherical surface of a term $Y^{10}$
E: Coefficient of nonspherical surface of a term $Y^{12}$
F: Coefficient of nonspherical surface of a term $Y^{14}$

TABLE 4

| | | | Wave length λ = 650 nm | | |
|---|---|---|---|---|---|
| NA/Focal distance/Entrance pupilϕ of objective (0.7/1.4 mm/1.96 mm) | | | Axial clearance | Refractive index ND/Aberration number | Refractive index N at |
| Surface | Radius of curvature (mm) | | (mm) | vd at a line d | 650 nm |
| OBJ | | ∞ | ∞ | | |
| STO | | ∞ | 0.0 | | |
| S1 | R: 1.13456 | C: −.629383E−3 | 1.032861 | 1.438750/95.0 | 1.437364 |
| | K: −0.40865 | D: −.394777E−2 | | | |
| | A: −220593E−1 | E: 0.0 | | | |
| | B: −.133861E−1 | F: 0.0 | | | |
| S2 | R: −828443 | C: −.10922E−3 | 0.211487 | | |
| | K: 0.0 | D: 0.168193E−2 | | | |
| | A: −.155426E−2 | E: 0.0 | | | |
| | B: −.155166E−2 | F: 0.0 | | | |
| S3 | R: 0.95320 | C: −.641939E−1 | 0.999484 | 1.438750/95.0 | 1.437364 |
| | K: −0.377658 | D: 0.0 | | | |
| | A: 0.473800E−1 | E: 0.0 | | | |
| | B: 0.436903E−1 | F: 0.0 | | | |
| S4 | | ∞ | 0.0 | | |
| S5 | | ∞ | 0.0 | | |
| S6 | | ∞ | 0.0 | | |
| S7 | | ∞ | 0.0 | | |
| S8 | | ∞ | 0.0 | | |
| S9 | | ∞ | 0.125342 | | |
| S10 | | ∞ | 0.1 | 1.5168/64.17 | 1.514523 |
| S11 | | ∞ | 0.0 | | |
| IMG | | ∞ | 0.0 | | |

Nonspherical surface equation $$X = \frac{Y^2 R}{1 + \{1 - (1+k)(Y/R)^2\}^{1/2}} + AY^4 + BY^6 + CY^8 + DY^{10} + EY^{12} + FY^{14}$$

X: Depth from an apex of surface
Y: Height from an optical axis
R: Proximal axis R
K: Circular cone constant
A: Coefficient of nonspherical surface of a term $Y^4$
B: Coefficient of nonspherical surface of a term $Y^6$
C: Coefficient of nonspherical surface of a term $Y^8$
D: Coefficient of nonspherical surface of a term $Y^{10}$
E: Coefficient of nonspherical surface of a term $Y^{12}$
F: Coefficient of nonspherical surface of a term $Y^{14}$

TABLE 5

Wave length λ = 410 nm

| Surface | NA/Focal distance/Entrance pupilφ of objective (0.85/1.765 mm/3.0 mm) Radius of curvature (mm) | | Axial clearance (mm) | Refractive index ND/Aberration number vd at a line d | Refractive index N at 410 nm |
|---|---|---|---|---|---|
| OBJ | | ∞ | ∞ | | |
| STO | | ∞ | 0.0 | | |
| S1 | R: 7.4<br>K: 0.0<br>A: 0.0<br>B: 0.0 | C: 0.0<br>D: 0.0<br>E: 0.0<br>F: 0.0 | 1.2 | 1.5168/64.17 | 1.529569 |
| S2 | R: −12.40435<br>K: 0.0<br>A: 0.0<br>B: 0.0 | C: 0.0<br>D: 0.0<br>E: 0.0<br>F: 0.0 | 1.0 | 1.75520/27.58 | 1.803040 |
| S3 | R: ∞<br>K: 0.0<br>A: 0.0<br>B: 0.0 | C: 0.0<br>D: 0.0<br>E: 0.0<br>F: 0.0 | 1.0 | | |
| S4 | R: ∞<br>K: 0.0<br>A: 0.0<br>B: 0.0 | C: 0.0<br>D: 0.0<br>E: 0.0<br>F: 0.0 | 1.0 | 1.75520/27.58 | 1.803040 |
| S5 | R: 13.24032<br>K: 0.0<br>A: 0.0<br>B: 0.0 | C: 0.0<br>D: 0.0<br>E: 0.0<br>F: 0.0 | 3.0 | | |
| S6 | R: 1.6273<br>K: −0.50566<br>A: −.207368E−2<br>B: −.999092E−3 | C: 0.749875E−4<br>D: −.204775E−3<br>E: 0.0<br>F: 0.0 | 1.564562 | 1.4955/81.6 | 1.504869 |
| S7 | R: 89.45684<br>K: 0.0<br>A: −291281E−2<br>B: 0.459860E−2 | C: −.332978E−2<br>D: 0.921202E−3<br>E: 0.0<br>F: 0.0 | 0.34768 | | |
| S8 | R: 1.30215<br>K: −0.503781<br>A: 0.193338E−1<br>B: 0.120697E−1 | C: 0.206089E−3<br>D: 0.0<br>E: 0.0<br>F: 0.0 | 1.282655 | 1.58913/61.3 | 1.604471 |
| S9 | | ∞ | 0.134216 | | |
| S10 | | ∞ | 0.1 | 1.5168/64.17 | 1.529569 |
| S11 | | ∞ | 0.0 | | |
| IMG | | ∞ | 0.0 | | |

Nonspherical surface equation $$X = \frac{Y^2 R}{1 + \{1 - (1+k)(Y/R)^2\}^{1/2}} + AY^4 + BY^6 + CY^8 + DY^{10} + EY^{12} + FY^{14}$$

X: Depth from an apex of surface
Y: Height from an optical axis
R: Proximal axis R
K: Circular cone constant
A: Coefficient of nonspherical surface of a term $Y^4$
B: Coefficient of nonspherical surface of a term $Y^6$
C: Coefficient of nonspherical surface of a term $Y^8$
D: Coefficient of nonspherical surface of a term $Y^{10}$
E: Coefficient of nonspherical surface of a term $Y^{12}$
F: Coefficient of nonspherical surface of a term $Y^{14}$

TABLE 6

Wave length λ = 650 nm

| Surface | NA/Focal distance/Entrance pupilφ of objective (0.85/1.765 mm/3.0 mm) Radius of curvature (mm) | | Axial clearance (mm) | Refractive index ND/Aberration number vd at a line d | Refractive index N at 650 nm |
|---|---|---|---|---|---|
| OBJ | | ∞ | ∞ | | |
| STO | | ∞ | 0.0 | | |
| S1 | R: 1.61696<br>K: −0.50566<br>A: −.207368E−2<br>B: −.999092E−3 | C: 0.749875E−4<br>D: −.204775E−3<br>E: 0.0<br>F: 0.0 | 1.652546 | 1.4955/81.6 | 1.493730 |

TABLE 6-continued

| | | | Wave length λ = 650 nm | | |
|---|---|---|---|---|---|
| NA/Focal distance/Entrance pupilφ of objective (0.85/1.765 mm/3.0 mm) | | | Axial clearance | Refractive index ND/Aberration number | Refractive index N at |
| Surface | Radius of curvature (mm) | | (mm) | vd at a line d | 650 nm |
| S2 | R: −2112.22413 | C: −.332978E−2 | 0.317255 | | |
| | K: 0.0 | D: 0.921202E−3 | | | |
| | A: −.291281E−2 | E: 0.0 | | | |
| | B: 0.459860E−2 | F: 0.0 | | | |
| S3 | R: 1.26974 | C: 0.206089E−3 | 1.260777 | 1.58913/61.3 | 1.586426 |
| | K: −0.503781 | D: 0.0 | | | |
| | A: 0.193338E−1 | E: 0.0 | | | |
| | B: 0.120697E−1 | F: 0.0 | | | |
| S4 | ∞ | | 0.0 | | |
| S5 | ∞ | | 0.0 | | |
| S6 | ∞ | | 0.0 | | |
| S7 | ∞ | | 0.0 | | |
| S8 | ∞ | | 0.0 | | |
| S9 | ∞ | | 0.136937 | | |
| S10 | ∞ | | 0.1 | 1.5168/64.17 | 1.514523 |
| S11 | ∞ | | 0.0 | | |
| IMG | ∞ | | 0.0 | | |

Nonspherical surface equation $$X = \frac{Y^2 R}{1 + \{1 - (1+k)(Y/R)^2\}^{1/2}} + AY^4 + BY^6 + CY^8 + DY^{10} + EY^{12} + FY^{14}$$

X: Depth from an apex of surface
Y: Height from an optical axis
R: Proximal axis R
K: Circular cone constant
A: Coefficient of nonspherical surface of a term $Y^4$
B: Coefficient of nonspherical surface of a term $Y^6$
C: Coefficient of nonspherical surface of a term $Y^8$
D: Coefficient of nonspherical surface of a term $Y^{10}$
E: Coefficient of nonspherical surface of a term $Y^{12}$
F: Coefficient of nonspherical surface of a term $Y^{14}$

TABLE 7

| | | | Wave length λ = 440 nm | | |
|---|---|---|---|---|---|
| NA/Focal distance/Entrance pupilφ of objective (0.55/1.8 mm/1.98 mm) | | | Axial clearance | Refractive index ND/Aberration number | Refractive index N at |
| Surface | Radius of curvature (mm) | | (mm) | vd at a line d | 440 nm |
| OBJ | ∞ | | 20.0 | | |
| STO | ∞ | | 0.0 | | |
| S1 | R: −5.23663 | C: 0.0 | 1.0 | 1.78472/25.71 | 1.823295 |
| | K: 0.0 | D: 0.0 | | | |
| | A: 0.0 | E: 0.0 | | | |
| | B: 0.0 | F: 0.0 | | | |
| S2 | R: −9.47002 | C: 0.0 | 0.1 | | |
| | K: 0.0 | D: 0.0 | | | |
| | A: 0.0 | E: 0.0 | | | |
| | B: 0.0 | F: 0.0 | | | |
| S3 | R: 20.358 | C: 0.0 | 1.8 | 1.62004/36.26 | 1.641035 |
| | K: 0.0 | D: 0.0 | | | |
| | A: 0.0 | E: 0.0 | | | |
| | B: 0.0 | F: 0.0 | | | |
| S4 | R: 4.921 | C: 0.0 | 2.5 | 1.5168/64.17 | 1.526269 |
| | K: 0.0 | D: 0.0 | | | |
| | A: 0.0 | E: 0.0 | | | |
| | B: 0.0 | F: 0.0 | | | |
| S5 | R: −7.021 | C: 0.0 | 3.0 | | |
| | K: 0.0 | D: 0.0 | | | |
| | A: 0.0 | E: 0.0 | | | |
| | B: 0.0 | F: 0.0 | | | |

TABLE 7-continued

| | | | Wave length λ = 440 nm | | |
|---|---|---|---|---|---|
| NA/Focal distance/Entrance pupilφ of objective (0.55/1.8 mm/1.98 mm) | | | Axial clearance | Refractive index ND/Aberration number | Refractive index N at |
| Surface | Radius of curvature (mm) | | (mm) | vd at a line d | 440 nm |
| S6 | R: 1.022246<br>K: −0.700344<br>A: −0.521041E−2<br>B: −.160629E−2 | C: −.104969E−2<br>D: −.204775E−3<br>E: 0.0<br>F: 0.0 | 1.1 | 1.438750/95.0 | 1.443854 |
| S7 | R: −2.44588<br>K: 0.0<br>A: 0.917902E−1<br>B: −.43981E−1 | C: 0.195359E−1<br>D: −445800E−2<br>E: 0.0<br>F: 0.0 | 0.0 | | |
| S8 | ∞ | | 0.0 | | |
| S9 | ∞ | | 0.811592 | | |
| S10 | ∞ | | 0.6 | 1.5168/64.17 | 1.526269 |
| S11 | ∞ | | 0.0 | | |
| IMG | ∞ | | 0.0 | | |

Nonspherical surface equation $$X = \frac{Y^2R}{1 + \{1 - (1 + k)(Y/R)^2\}^{1/2}} + AY^4 + BY^6 + CY^8 + DY^{10} + EY^{12} + FY^{14}$$

X: Depth from an apex of surface
Y: Height from an optical axis
R: Proximal axis R
K: Circular cone constant
A: Coefficient of nonspherical surface of a term $Y^4$
B: Coefficient of nonspherical surface of a term $Y^6$
C: Coefficient of nonspherical surface of a term $Y^8$
D: Coefficient of nonspherical surface of a term $Y^{10}$
E: Coefficient of nonspherical surface of a term $Y^{12}$
F: Coefficient of nonspherical surface of a term $Y^{14}$

TABLE 8

| | | | Wave length λ = 650 nm | | |
|---|---|---|---|---|---|
| NA/Focal distance/Entrance pupilφ of objective (0.55/1.8 mm/1.98 mm) | | | Axial clearance | Refractive index ND/Aberration number | Refractive index N at |
| Surface | Radius of curvature (mm) | | (mm) | vd at a line d | 650 nm |
| OBJ | ∞ | | 10.245243 | | |
| STO | ∞ | | 0.0 | | |
| S1 | R: 21.47517<br>K: 0.0<br>A: 0.0<br>B: 0.0 | C: 0.0<br>D: 0.0<br>E: 0.0<br>F: 0.0 | 1.8 | 1.62004/36.26 | 1.615422 |
| S2 | R: 4.60808<br>K: 0.0<br>A: 0.0<br>B: 0.0 | C: 0.0<br>D: 0.0<br>E: 0.0<br>F: 0.0 | 2.5 | 1.5168/64.17 | 1.514523 |
| S3 | R: −6.83732<br>K: 0.0<br>A: 0.0<br>B: 0.0 | C: 0.0<br>D: 0.0<br>E: 0.0<br>F: 0.0 | 3.0 | | |
| S4 | R: 1.00962<br>K: −0.700344<br>A: 0.521041E−2<br>B: −.160629E−2 | C: −.104969E−2<br>D: −.713744E−3<br>E: 0.0<br>F: 0.0 | 1.040433 | 1.438750/95.0 | 1.437364 |
| S5 | R: −2.44588<br>K: 0.0<br>A: 0.917902E−1<br>B: −.439814E−1 | C: 0.195359E−1<br>D: −445800E−2<br>E: 0.0<br>F: 0.0 | 0.0 | | |
| S6 | ∞ | | 0.0 | | |
| S7 | ∞ | | 0.0 | | |
| S8 | ∞ | | 0.0 | | |
| S9 | ∞ | | 0.838185 | | |

TABLE 8-continued

|  | | Wave length λ = 650 nm | | |
|---|---|---|---|---|
| NA/Focal distance/Entrance pupilφ of objective (0.55/1.8 mm/1.98 mm) | | Axial clearance | Refractive index ND/Aberration number | Refractive index N at |
| Surface | Radius of curvature (mm) | (mm) | vd at a line d | 650 nm |
| S10 | ∞ | 0.6 | 1.5168/64.17 | 1.514523 |
| S11 | ∞ | 0.0 | | |
| IMG | ∞ | 0.0 | | |

Nonspherical surface equation $$X = \frac{Y^2 R}{1 + \{1 - (1+k)(Y/R)^2\}^{1/2}} + AY^4 + BY^6 + CY^8 + DY^{10} + EY^{12} + FY^{14}$$

X: Depth from an apex of surface
Y: Height from an optical axis
R: Proximal axis R
K: Circular cone constant
A: Coefficient of nonspherical surface of a term $Y^4$
B: Coefficient of nonspherical surface of a term $Y^6$
C: Coefficient of nonspherical surface of a term $Y^8$
D: Coefficient of nonspherical surface of a term $Y^{10}$
E: Coefficient of nonspherical surface of a term $Y^{12}$
F: Coefficient of nonspherical surface of a term $Y^{14}$

What is claimed is:

1. An optical element for correcting chromatic aberration arranged between a light source with a wavelength being 440 nm or less and an objective with a numerical aperture NA being 0.55 or more, with a focal distance being 1.8 mm or more and with an Abbe number at a d-line being 95.0 or less,
    wherein said optical element for correcting chromatic aberration has a convex lens with at least an Abbe number at the d-line being 55 or more and a concave lens with an Abbe number at the d-line being 35 or less.

2. An optical element for correcting chromatic aberration arranged between a light source with a wavelength being 440 nm or less and an objective composed of two lenses with numerical aperture NA being 0.70 or more, with a focal distance being 1.4 mm or more and with an Abbe number at a d-line being 95.0 or less,
    wherein said optical element for correcting chromatic aberration has a convex lens with at least an Abbe number of the d-line being 55 or more and a concave lens with an Abbe number at the d-line being 35 or less.

3. An optical pick-up device comprising:
    a light source with at least a wavelength being 440 nm or less;
    an objective with numerical aperture NA being 0.55 or more, a focal distance being 1.8 mm or more and an Abbe number at a d-line being 95.0 or less; and
    an optical element for correcting a chromatic aberration arranged between said light source and said objective,
    wherein said optical element for correcting a chromatic aberration has a convex lens with at least an Abbe number at the d-line being 55 or more and a concave lens with an Abbe number at the d-line being 35 or less.

4. An optical pick-up device comprising:
    a light source with at least a wavelength being 440 nm or less;
    an objective composed of two lenses with numerical aperture NA being 0.70 or more, a focal distance being 1.4 mm or more and an Abbe number at a d-line being 95.0 or less; and
    an optical element for correcting a chromatic aberration arranged between said light source and said objective;
    wherein said optical element for correcting a chromatic aberration has a convex lens with at least an Abbe number at the d-line being 55 or more and a concave lens with an Abbe number at the d-line being 35 or less.

5. The optical pick-up device according to claim 3 or claim 4, wherein:
    said optical element for correcting a chromatic aberration is a collimator lens for converting a radiated light radiated from said light source into a parallel light.

6. An optical reproducing device comprising:
    an optical pick-up device including:
        a light source with at least a wavelength being 440 nm or less;
        an objective for collecting radiated light from said light source to an optical recording medium with numerical aperture NA being 0.55 or more, a focal distance being 1.8 mm or more and an Abbe number at a d-line being 95.0 or less; and
        an optical element for correcting a chromatic aberration arranged between said light source and said objective; and
    a controlling and driving means for controlling and driving the optical pick-up device to a tracking direction,
    wherein said optical element for correcting a chromatic aberration has a convex lens with at least an Abbe number at the d-line being 55 or more and a concave lens with an Abbe number at the d-line being 35 or less.

7. An optical reproducing device comprising:
    an optical pick-up device including:
        a light source with at least a wavelength being 440 nm or less;
        an objective for collecting radiated light from said source to an optical recording medium and composed of two lenses with numerical aperture NA being 0.70 or more, a focal distance being 1.4 mm or more and an Abbe number at a d-line being 95.0 or less;
        an optical element for correcting a chromatic aberration arranged between said light source and said objective; and
        a controlling and driving means for controlling and driving said optical pick-up device to a tracking direction of said optical recording medium;

wherein said optical element for correcting a chromatic aberration has a convex lens with at least an Abbe number at the d-line being 55 or more and a concave lens with an Abbe number at the d-line being 35 or less.

8. The optical reproducing device according to claim 6 or claim 7, wherein:

said optical element for correcting a chromatic aberration is a collimator lens for converting a radiated light radiated from said light source into a parallel light.

9. An optical recording and reproducing device comprising:

an optical pick-up device including:

a light source with at least a wavelength being 440 nm or less;

an objective for collecting radiated light from said light source with numerical aperture NA being 0.55 or more, a focal distance being 1.8 mm or more and an Abbe number at a d-line being 95.0 or less; and an optical element for correcting a chromatic aberration arranged between said light source and said objective; and a controlling and driving means for controlling and driving said optical pick-up device to a tracking direction of said optical recording medium; and wherein said optical element for correcting a chromatic aberration has a convex lens with at least an Abbe number at the d-line being 55 or more and a concave lens with an Abbe number at the d-line being 35 or less.

10. An optical recording and reproducing device comprising:

an optical pick-up device including:

a light source with at least a wavelength being 440 nm or less;

an objective for collecting radiated light from said light source to an optical recording medium and composed of two lenses with numerical aperture NA being 0.70 or more, a focal distance being 1.4 mm or more and an Abbe number at a d-line being 95.0 or less; and an optical element for correcting a chromatic aberration arranged between said light source and said objective; and a controlling and driving means for controlling and driving said optical pick-up device to a tracking direction of said optical recording medium;

wherein said optical element for correcting a chromatic aberration has a convex lens with at least an Abbe number at the d-line being 55 or more and a concave lens with an Abbe number at the d-line being 35 or less.

11. An optical recording and reproducing device according to claim 9 or claim 10, wherein:

said optical element for correcting a chromatic aberration is a collimator lens for converting a radiated light radiated from said light source into a parallel light.

* * * * *

UNITED STATES PATENT AND TRADEMARK OFFICE
CERTIFICATE OF CORRECTION

PATENT NO. : 6,570,827 B1
DATED : May 27, 2003
INVENTOR(S) : Kenji Yamamoto et al.

It is certified that error appears in the above-identified patent and that said Letters Patent is hereby corrected as shown below:

Column 4,
Line 42, change "$V_2 > V_3$" to -- $v_2 > v_3$ --.
Line 45, change "$V_2 < V_3$" to -- $v_2 < v_3$ --.

Column 9,
Line 48, change "1apositioned" to -- 1a positioned --.

Column 18,
Line 58, change "$1+\{1-(1+k)(Y/R)^2\}^{1/2}$" to -- $1+\{1-(1+K)(Y/R)^2\}^{1/2}$ --.

Column 21,
Lines 19 and 63, change "$1+\{1-(1+k)(Y/R)^2\}^{1/2}$" to -- $1+\{1-(1+K)(Y/R)^2\}^{1/2}$ --.

Column 23,
Line 37, change "$1+\{1-(1+k)(Y/R)^2\}^{1/2}$" to -- $1+\{1-(1+K)(Y/R)^2\}^{1/2}$ --.

Column 25,
Line 27, change "$1+\{1-(1+k)(Y/R)^2\}^{1/2}$" to -- $1+\{1-(1+K)(Y/R)^2\}^{1/2}$ --.

Column 27,
Line 24, change "$1+\{1-(1+k)(Y/R)^2\}^{1/2}$" to -- $1+\{1-(1+K)(Y/R)^2\}^{1/2}$ --.

Column 29,
Line 13, change "$1+\{1-(1+k)(Y/R)^2\}^{1/2}$" to -- $1+\{1-(1+K)(Y/R)^2\}^{1/2}$ --.

Signed and Sealed this

Twenty-seventh Day of January, 2004

JON W. DUDAS
*Acting Director of the United States Patent and Trademark Office*